US010675539B2

(12) United States Patent
Odagiri et al.

(10) Patent No.: US 10,675,539 B2
(45) Date of Patent: Jun. 9, 2020

(54) GAME PROGRAM AND GAME SYSTEM

(71) Applicant: SQUARE ENIX CO., LTD., Tokyo (JP)

(72) Inventors: Kei Odagiri, Tokyo (JP); Hiroaki Ohno, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 652 days.

(21) Appl. No.: 15/089,974

(22) Filed: Apr. 4, 2016

(65) Prior Publication Data

US 2017/0106285 A1    Apr. 20, 2017

(30) Foreign Application Priority Data

Oct. 14, 2015 (JP) .................. 2015-202577

(51) Int. Cl.
*A63F 13/525* (2014.01)
*H04N 5/232* (2006.01)
(Continued)

(52) U.S. Cl.
CPC ............ *A63F 13/525* (2014.09); *A63F 13/25* (2014.09); *A63F 13/30* (2014.09); *H04N 5/232* (2013.01)

(58) Field of Classification Search
CPC ........ A63F 13/525; A63F 13/25; A63F 13/30; H04N 5/232
(Continued)

(56) References Cited

U.S. PATENT DOCUMENTS 9,573,062 B1 * 2/2017 Long .................... H04N 13/117
2004/0209684 A1 * 10/2004 Hisano .................... A63F 13/10
463/32
(Continued)

FOREIGN PATENT DOCUMENTS

JP    2010-142404    7/2010
JP    2014-184300    10/2014

OTHER PUBLICATIONS

ZackScottGames, Mario Kart Gameplay Part 1—50 cc Mushroom Cup (Nintendo Wii U Walkthrough), published to Youtube May 30, 2014, retrieved from Internet URL<https://www.youtube.com/watch?v=Amz4sLmrRdl>. see @0:00-3:00, Fig. 1-5. (Year: 2014).*
(Continued)

*Primary Examiner* — Jay Trent Liddle
*Assistant Examiner* — Ryan Hsu
(74) *Attorney, Agent, or Firm* — Greenblum & Bernstein, P.L.C.

(57) ABSTRACT

There is provided a game program causing a computer to realize a function of controlling progress of a game by imaging, with a virtual camera, a three-dimensional game space in which a plurality of objects including a player object are disposed, and displaying the game space on a display unit as a game image, the program causing the computer to execute a mode setting function of setting a display mode of a game image displayed on the display unit out of at least a normal mode and a scenery mode according to a predetermined condition, an imaging function of causing the virtual camera to perform imaging at a plurality of imaging positions in the game space in a case where the display mode is the scenery mode, and a display control function of displaying a game image captured by the virtual camera on the display unit.

19 Claims, 29 Drawing Sheets

(51) Int. Cl.
*A63F 13/25* (2014.01)
*A63F 13/30* (2014.01)

(58) Field of Classification Search
USPC .......................................................... 463/31
See application file for complete search history.

(56) References Cited

U.S. PATENT DOCUMENTS

| | | | | |
|---|---|---|---|---|
| 2007/0270215 | A1* | 11/2007 | Miyamoto | A63F 13/10 463/32 |
| 2011/0207532 | A1* | 8/2011 | Terada | G06T 15/20 463/31 |
| 2013/0065682 | A1* | 3/2013 | Izuno | A63F 13/428 463/31 |
| 2013/0172084 | A1* | 7/2013 | Cudak | A63F 13/12 463/42 |
| 2014/0243089 | A1* | 8/2014 | Tsukioka | A63F 13/12 463/31 |

OTHER PUBLICATIONS

Reddit, "Can you skip credits in MK8D" published 2017 at Internet URL <https://www.reddit.com/r/mariokart/comments/68s4unn/can_you_skip_credits_in_mk8d/>, p. 1-4. (Year: 2017).*

Office Action from Japan Patent Office (JPO) in Japanese Patent Appl. No. 2015-202577, dated Oct. 18, 2016, together with an English language translation.

* cited by examiner

GAME PROGRAM AND GAME SYSTEM

BACKGROUND OF THE INVENTION

1. Field of the Invention

At least one of embodiments of the present invention relates to a game program and the like for causing a computer to realize a function of controlling progress of a game by imaging a three-dimensional game space with a virtual camera and displaying the game space as a game image on a display unit.

2. Description of Related Art

A video game apparatus (game system) generates, for example, a three-dimensional game space in which a player object and other objects are disposed, and displays, on a display device, a game image obtained by imaging a state of the game space with a virtual camera. A user visually recognizes the state (game situation) of the game space displayed on the display device, and causes a game to progress by operating the player object by using a game pad or the like. For this reason, a position or the like of the virtual camera is controlled so that the game space around the player object is displayed on the display device at all times (for example, refer to JP-A-2014-184300). More specifically, the virtual camera is controlled to be located on an upper side of the back face of the player object, and a game image including the player object is displayed on the display device.

In recent years, online games and the like have been provided from a game server apparatus connected by a network, such as the Internet to a game apparatus (user terminal). Such an online game also provides a chat function of having conversations with other users during gameplay, a function (automatic matching) of finding other users in order to assemble a party to initiate cooperative gameplay, and the like.

SUMMARY OF THE INVENTION

In the above-described game system, a game image including the player object is displayed on the display device, even in a state in which the number of times of operating the player object is small, such as chatting during playing of the game. In this state, since the player object is scarcely operated, the virtual camera is also not moved, and the display content (game image) of the display device almost does not change. Thus, there is a possibility of a reduction in the interest of a user.

An object of at least one embodiment of the present invention is to provide a function of displaying a game image that is interesting a user by solving the above problems.

From the non-limiting viewpoint, according to an aspect of the present invention, there is provided a game program causing a computer to realize a function of controlling progress of a game by imaging, with a virtual camera, a three-dimensional game space in which a plurality of objects including a player object controlled by a user are disposed, and displaying the game space on a display unit as a game image, the program causing the computer to execute a mode setting function of setting a display mode of a game image displayed on the display unit out of at least a normal mode and a scenery mode according to a predetermined condition; an imaging function of causing the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display control function of displaying a game image captured by the virtual camera on the display unit, and displaying game images captured at the plurality of imaging positions in a predetermined display embodiment in a case where the display mode is the scenery mode.

From the non-limiting viewpoint, according to another aspect of the present invention, there is provided a game program causing a server apparatus to control progress of a game, the server apparatus being connected to a game user terminal via a communication network, the game user terminal executing the game by imaging, with a virtual camera, a three-dimensional game space in which a plurality of objects including a player object controlled by a user are disposed, and displaying the game space on a display unit as a game image, the program causing the server apparatus to execute a mode setting function of setting a display mode of a game image displayed on the display unit out of at least a normal mode and a scenery mode according to a predetermined condition; an imaging function of causing the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display control function of displaying a game image captured by the virtual camera on the display unit, and displaying game images captured at the plurality of imaging positions in a predetermined display embodiment in a case where the display mode is the scenery mode.

From the non-limiting viewpoint, according to still another aspect of the present invention, there is provided a game system including a server apparatus connected to a game user terminal via a communication network, the game user terminal executing a game by imaging, with a virtual camera, a three-dimensional game space in which a plurality of objects including a player object controlled by a user are disposed, and displaying the game space on a display unit as a game image, the system including a mode setter configured to set a display mode of a game image displayed on the display unit out of at least a normal mode and a scenery mode according to a predetermined condition; an imager configured to cause the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display controller configured to display a game image captured by the virtual camera on the display unit, and displaying game images captured at the plurality of imaging positions in a predetermined display embodiment in a case where the display mode is the scenery mode.

One or two or more deficiencies are solved by each embodiment of the present application.

DESCRIPTION OF EMBODIMENTS

Hereinafter, examples of embodiments of the present invention will be described with reference to the drawings. Various constituent elements in the examples of the embodiments described below may be combined with each other as appropriate, unless contradiction or the like occurs therein. The content described in an example of a certain embodiment is not described in other embodiments in some cases. The content of an operation or a process which is not related to a feature portion of each embodiment is omitted in some cases. An order of various processes constituting various flows described below is arbitrary, unless contradiction or the like occurs in the process content.

First Embodiment

Figure 1:
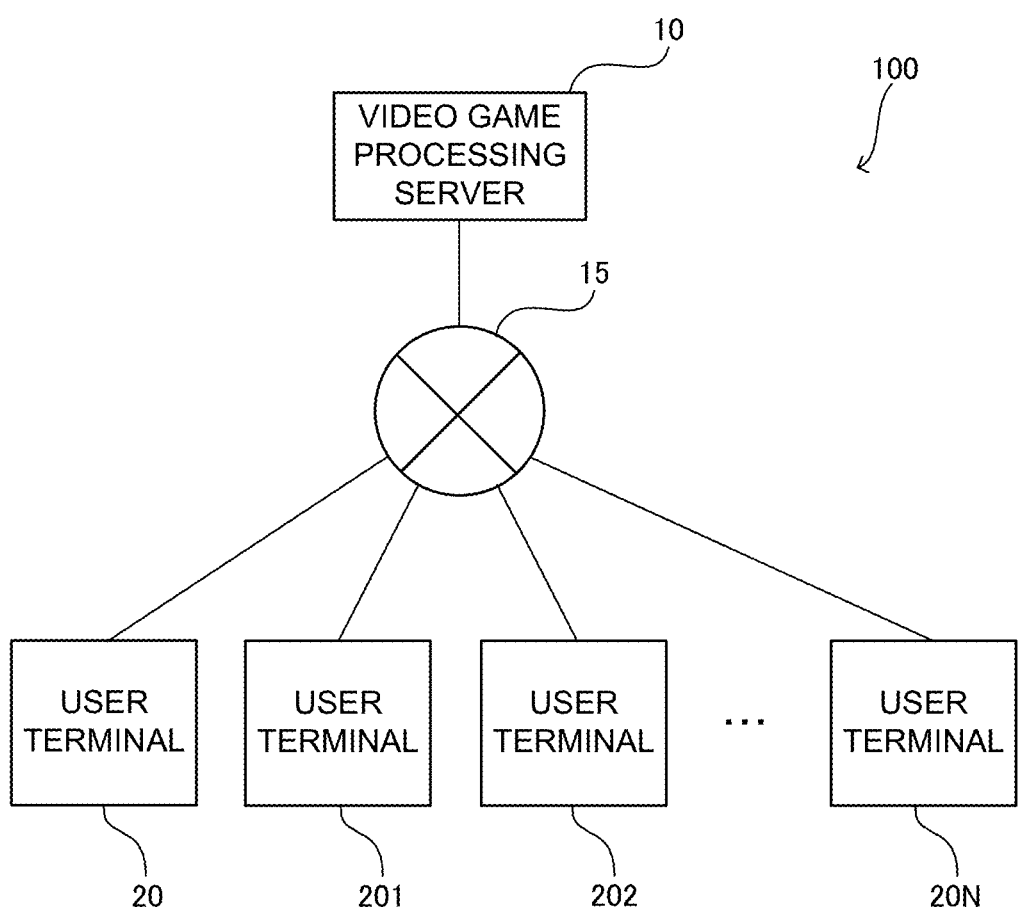
FIG. 1 is a block diagram illustrating an example of a configuration of a video game processing system corresponding to at least one embodiment of the present invention.
Figure 2:
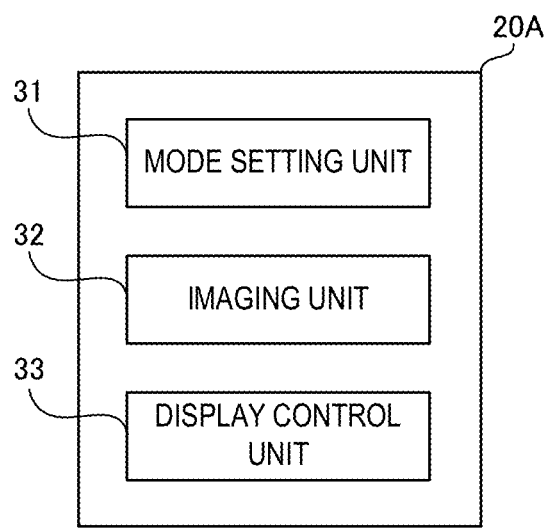
FIG. 2 is a block diagram illustrating a configuration of a user terminal corresponding to at least one embodiment of the present invention.

FIG. 1 is a block diagram illustrating an example of a configuration of a video game processing system 100 according to an embodiment of the present invention. As illustrated in FIG. 1, the video game processing system 100 includes a video game processing server 10, and user terminals 20 and 201 to 20N (where N is any integer) used by a plurality of users (players) playing a video game (game). The video game processing server 10 and the plurality of user terminals 20 and 201 to 20N are connected to a communication network 15, such as the Internet. A configuration of the video game processing system 100 is not limited thereto. For example, there may be a configuration in which a single user terminal is used by a plurality of players, and there may be a configuration in which a plurality of video game processing servers are provided. There may be a configuration in which a game processing server is not provided.

The video game processing system 100 has various functions of executing a video game including a game in which each of a plurality of users operates a player object, for example, in the same (common) three-dimensional game space (synchronized virtual space). A state of the game space imaged by a virtual camera is displayed on display devices (display units) of the user terminals 20 and 201 to 20N as a game image.

In this video game, a display mode of the game image displayed on the display unit is selected and set out of at least a normal mode and a scenery mode according to a predetermined condition. The normal mode is a mode for displaying a game image of a game space around at least a player object. The scenery mode is a mode for displaying game images captured at various positions in a game space in which a player object is present.

The video game processing server 10 is managed by a manager of the video game processing system 100, and has various functions for providing information regarding a video game to the user terminals 20 and 201 to 20N. For example, the video game processing server 10 receives position information or the like of a player object of each user from the user (user terminal), and provides information (position information or the like of other player objects) regarding the video game for causing the game to progress in the user terminals 20 and 201 to 20N. In this embodiment, the video game processing server 10 is constituted of an information processing device, such as a WWW server, so as to provide information regarding the video game, and includes a database storing various pieces of information, but has a general configuration, and thus description thereof will be omitted here.

Each of the plurality of user terminals 20 and 201 to 20N is managed by a user playing the video game, and is constituted of a communication terminal which can execute an online game, such as a stationary game apparatus, a personal computer, a mobile phone terminal, a personal digital assistant (PDA), or a portable game apparatus.

Each of the user terminals 20 and 201 to 20N includes a plurality of operation devices (operation units), a storage unit such as an HDD, a control unit constituted of a CPU and the like which execute a game and generate a game image, a display device (display unit) displaying the game image, and the like, in order to execute a video game, but detailed description thereof will be omitted. In each of the user terminals 20 and 201 to 20N, software (game program) for executing a video game according to an example of one embodiment of the present invention and controlling progress of the game is stored in the storage unit.

Next, a description will be made of a configuration of a user terminal 20A as an example of a configuration of the user terminal 20. The user terminal 20A includes at least a mode setting unit 31, an imaging unit 32, and a display control unit 33, for controlling progress of a video game by the control unit executing the game program stored in the storage unit.

The remaining user terminals 201 to 20N have the same configuration, and thus description thereof will be omitted here.

The mode setting unit 31 sets the display mode of a game image displayed on the display unit out of at least the normal mode and the scenery mode according to a preset predetermined condition. The imaging unit 32 controls a virtual camera. In a case where the display mode is the normal mode, the imaging unit 32 causes the virtual camera which is disposed on the basis of a position of a player object, to perform imaging. In a case where the display mode is the scenery mode, the imaging unit 32 causes the virtual camera to perform imaging at a plurality of imaging positions in a game space. The display control unit 33 displays a game image captured by the virtual camera on the display unit. Particularly, in a case where the display mode is the scenery mode, the display control unit 33 displays game images captured at a plurality of imaging positions on the display unit in a predetermined display embodiment.

Next, a description will be made of an operation of the game system 100 (system 100) of this embodiment.

Figure 3:
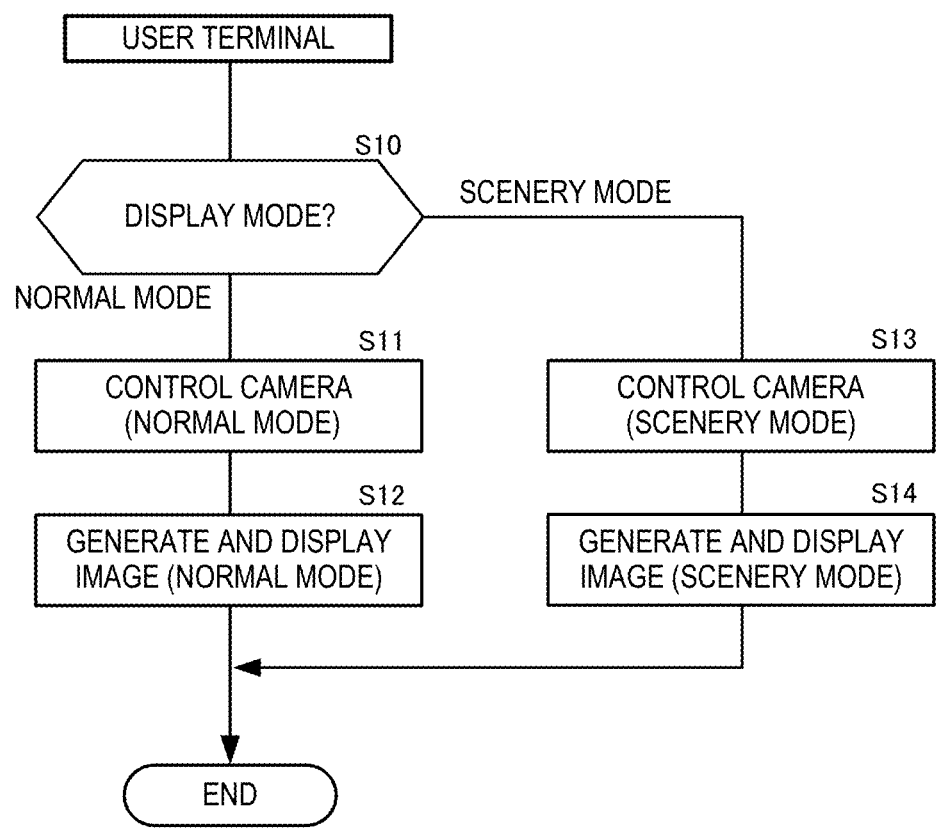
FIG. 3 is a flowchart illustrating an example of an imaging display process corresponding to at least one embodiment of the present invention.

FIG. 3 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20A performs the imaging display process.

The imaging display process of this example is repeatedly performed in the unit of one frame (for example, 1/60 seconds) from starting of display of a game space and ending thereof. The user terminal 20A receives information regarding a video game from the video game processing server 10 before performing the imaging display process.

In the imaging display process, the user terminal 20A determines whether the display mode is the normal mode or the scenery mode (step S10). For example, the determination is performed on the basis of mode information set by the mode setting unit 31. If it is determined that the display mode is the normal mode (step S10: normal mode), the user terminal 20A controls the virtual camera in the normal mode (step S11). For example, a position (viewpoint position) and a direction (visual line) of the virtual camera are determined on the basis of a position of a player object, and imaging is performed. Thereafter, the user terminal 20A generates an image (game image) of a game space captured by the virtual camera through the process in step S11, and displays the game image on the display unit (step S12).

On the other hand, if it is determined that the display mode is the scenery mode through the process in step S10, the user terminal 20A controls the virtual camera in the scenery mode (step S13). For example, one of a plurality of imaging positions in the game space is selected, and imaging in the virtual camera is performed at the selected imaging position (viewpoint position). Thereafter, the user terminal 20A generates an image (game image) of the game space captured by the virtual camera through the process in step S13, and displays the game image on the display unit (step S14). The above-described process is repeatedly performed in the scenery mode, and, thus, for example, various states of the game space are displayed on the display unit according to an imaging position selected from among a plurality of imaging positions in the game space. In other words, there is a display embodiment in which game images captured at the plurality of imaging positions are displayed in the imaging order.

As mentioned above, as one aspect of the first embodiment, since the user terminal 20A is configured to include the mode setting unit 31, the imaging unit 32, and the display control unit 33, it is possible to display a game image which may interest the user on the display unit by executing the scenery mode, for example, even in a situation in which a player object is scarcely operated.

In the above-described example of the first embodiment, the user terminal 20A receives the information regarding the video game from the video game processing server 10, but may not receive the information. In this case, the user terminal 20A may control progress of a game in a stand-alone manner.

In the above-described example of the first embodiment, the user terminal 20A controls progress of a game by executing the game program, but is not particularly limited thereto. There may be a configuration in which the video game processing server 10 includes the mode setting unit 31, the imaging unit 32, and the display control unit 33 instead of the user terminal 20A.

Figure 4:
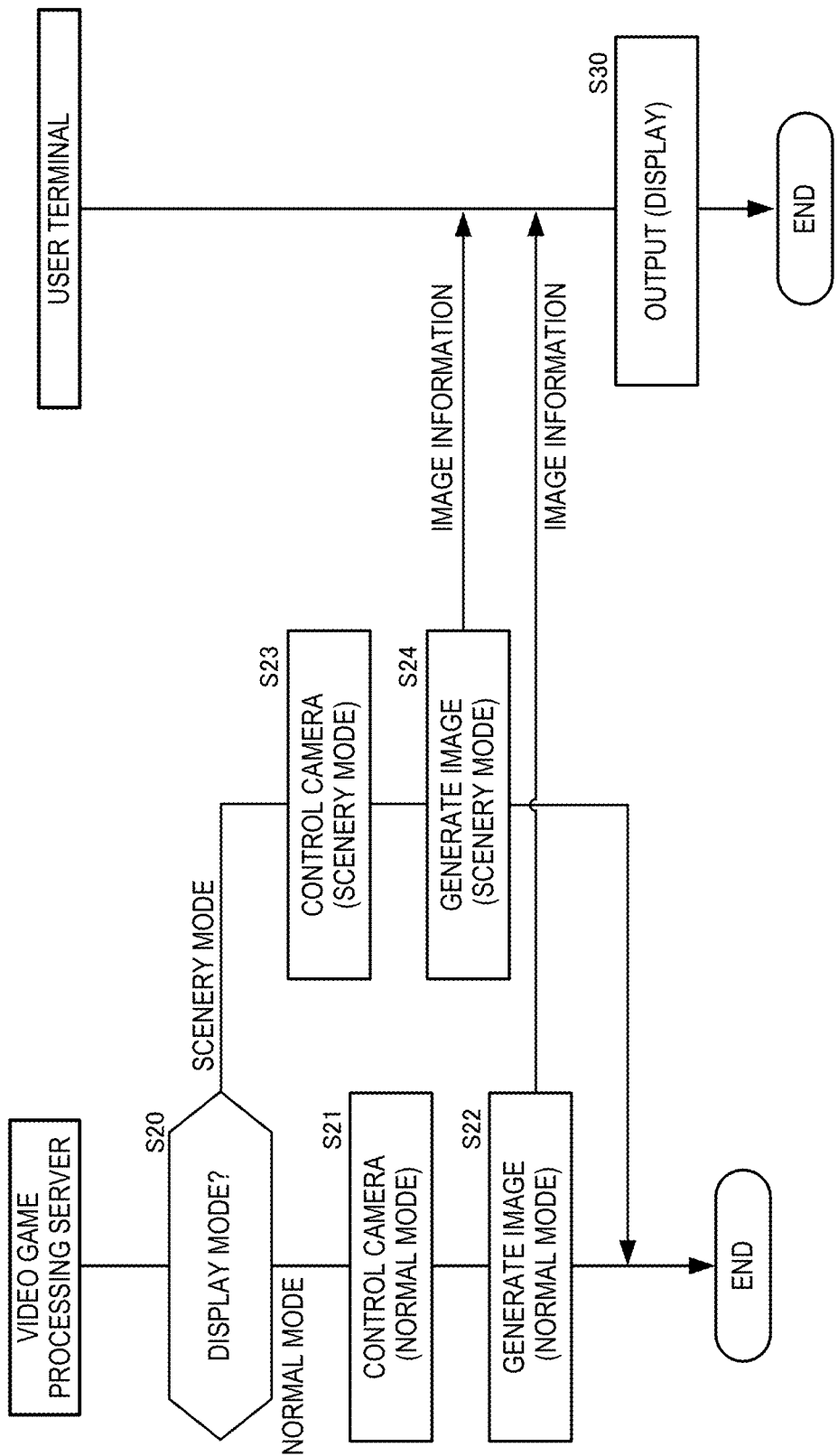
FIG. 4 is a flowchart illustrating an example of an operation in a case where a video game processing server corresponding to at least one embodiment of the present invention performs an imaging display process.

FIG. 4 is a flowchart illustrating an example of an operation of the video game processing server 10 (server 10) in a case where the video game processing server 10 performs the imaging display process illustrated in FIG. 3. In the imaging display process, the server 10 determines whether the display mode is the normal mode or the scenery mode (step S20). If it is determined that the display mode is the normal mode (step S20: normal mode), the server 10 controls the virtual camera in the normal mode (step S21). Thereafter, the server 10 generates an image (game image) of a game space captured by the virtual camera through the process in step S21, and transmits the generated game image to the user terminal 20 so that the game image is displayed on the display unit of the user terminal 20 (step S22).

On the other hand, if it is determined that the display mode is the scenery mode through the process in step S20, the server 10 controls the virtual camera in the scenery mode (step S23). Thereafter, the server 10 generates an image (game image) of the game space captured by the virtual camera through the process in step S23, and transmits the generated game image to the user terminal 20 so that the game image is displayed on the display unit of the user terminal 20 (step S24). Then, the user terminal 20 performs outputting (display on the display unit) corresponding to the game image information received from the server 10 (step S30).

A predetermined condition for setting either of the normal mode and the scenery mode in the above-described example of the first embodiment includes, for example, history in which a user has selected each mode by operating the operation unit. For example, in a case where the user chats with other users during gameplay, the user selects the scenery mode. Consequently, the user can enjoy watching states of various game spaces while chatting with other users. The display mode during the start of gameplay may be initially set to the normal mode.

As a game image displayed in the normal mode in the above-described example of the first embodiment, for example, there is a game image including a player object and a game space around the player object. In this case, a position and a direction of a virtual camera may be determined on the basis of a position of the player object so that the player object is included in the game image.

As a game image displayed in the scenery mode in the above-described example of the first embodiment, for example, there is a game image including a player object, player objects of other users, enemy objects, and objects of light, a doorbell, and the like. In this case, each imaging position and a direction of the virtual camera may be determined in a one-to-one correspondence relationship with each object so that each object is included in the game image. A direction of the virtual camera may be determined on the basis of a relationship with the imaging position, for example, if a point of gaze is set in an object in a fixed manner. In other words, a direction from an imaging position toward the point of gaze is a direction of the virtual camera.

For example, a plurality of positions in a game space, which are randomly acquired, may be used as imaging positions. In this case, a direction of the virtual camera may also be randomly determined. Alternatively, an imaging region may be set in a game space in advance, and a plurality of positions which are randomly acquired in the imaging region may be used as imaging positions. A plurality of imaging positions may be stored in the storage unit of the user terminal 20A in advance, and imaging may be performed in a predetermined order. Virtual cameras may be respectively disposed at a plurality of imaging positions, and a single virtual camera may be moved to respective imaging positions.

The predetermined display embodiment of a game image in the scenery mode in the above-described example of the first embodiment may be, for example, a display embodiment in which the game images captured at the plurality of imaging positions are displayed in a predetermined order, or a display embodiment in which the game images at the plurality of imaging positions are displayed on a single screen of the display unit together. A game image in the scenery mode may be a moving image and a still image. A game image captured in the past may be used.

Second Embodiment

Figure 5:
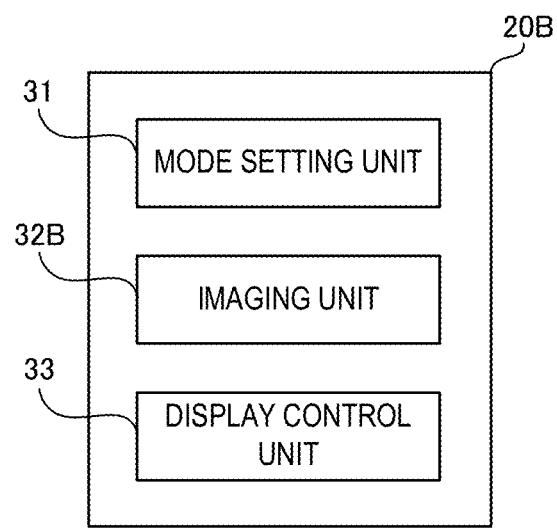
FIG. 5 is a block diagram illustrating a configuration of a user terminal corresponding to at least one embodiment of the present invention.

FIG. 5 is a block diagram illustrating a configuration of a user terminal 20B as an example of the user terminal 20. In this example, the user terminal 20B includes at least a mode setting unit 31, an imaging unit 32B, and a display control unit 33.

In the same manner as in the first embodiment, the mode setting unit 31 sets a display mode of a game image displayed on the display unit out of at least the normal mode and the scenery mode. The imaging unit 32B controls a virtual camera. In a case where the display mode is the normal mode, the imaging unit 32B causes the virtual camera which is disposed on the basis of a position of a player object, to perform imaging. In a case where the display mode is the scenery mode, the imaging unit 32B causes the virtual camera to perform imaging at a plurality of imaging positions in a game space. The imaging unit 32B determines the above-described plurality of imaging positions on the basis of positions of at least some objects among a plurality of objects (including a player object) disposed in a game space.

In the same manner as in the first embodiment, the display control unit 33 displays a game image captured by the virtual camera on the display unit, and, particularly, in a case where the display mode is the scenery mode, the display control unit 33 displays game images captured at a plurality of imaging positions on the display unit in a predetermined display embodiment.

Figure 6:
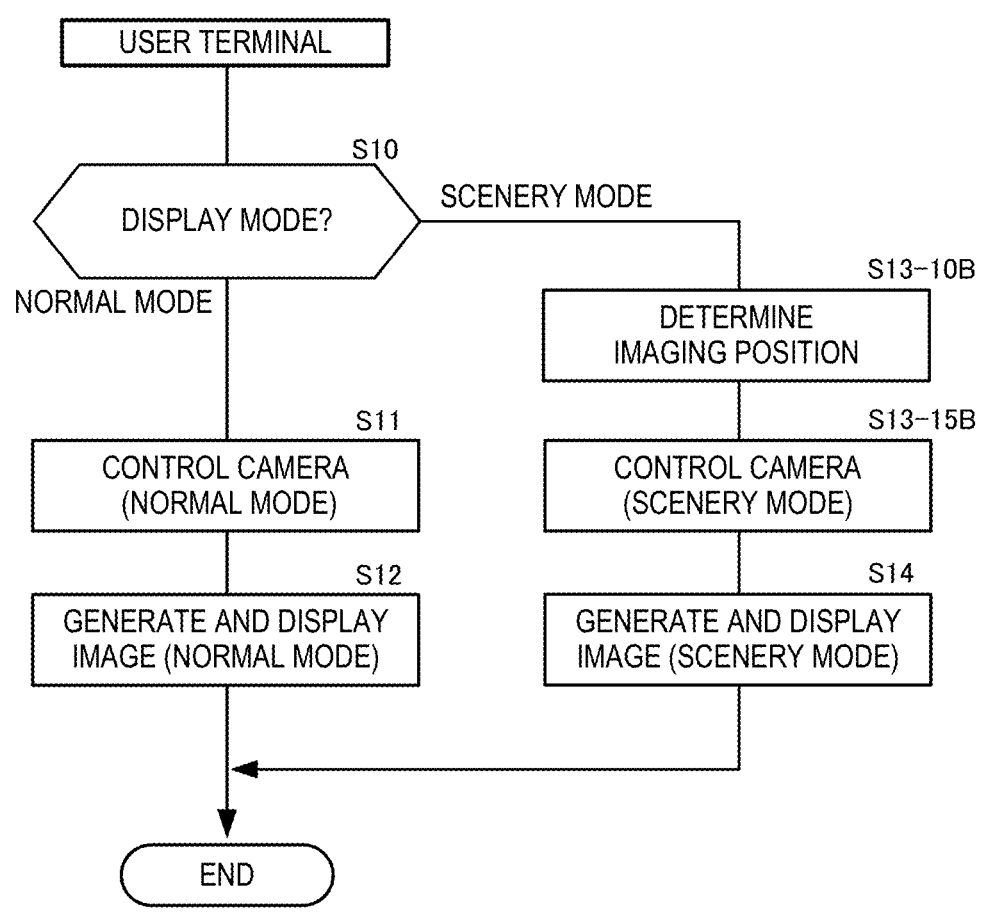
FIG. 6 is a flowchart illustrating an example of an imaging display process corresponding to at least one embodiment of the present invention.

FIG. 6 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20B performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20B receives information regarding a video game from the video game processing server 10 before performing the imaging display process.

In the imaging display process, the user terminal 20B determines whether the display mode is the normal mode or the scenery mode (step S10). If it is determined that the display mode is the normal mode (step S10: normal mode), the user terminal 20B controls the virtual camera in the normal mode (step S11). Thereafter, the user terminal 20B generates an image (game image) of a game space captured by the virtual camera through the process in step S11, and displays the game image on the display unit (step S12).

On the other hand, if it is determined that the display mode is the scenery mode through the process in step S10, the user terminal 20B determines an imaging position (viewpoint position) (step S13-10B). For example, a single imaging position is determined (calculated) on the basis of a position of one of a plurality of objects (including a player object). For example, the imaging position is calculated by randomly selecting one of positions which are separated from the position of the single object (one of the plurality of objects) by a predetermined distance. Next, the user terminal 20B controls the virtual camera in the scenery mode (step S13-15B). For example, imaging in the virtual camera is performed at the imaging position determined through the process in step S13-10B. In this case, a direction of the virtual camera may employ a fixed value which is set in advance, and may be determined on the basis of a point of gaze set in the single object and the determined imaging position.

Thereafter, the user terminal 20B generates an image (game image) of the game space captured by the virtual camera through the process in step S13-15B, and displays the game image on the display unit (step S14). The above-described process is repeatedly performed in the scenery mode, and, thus, for example, various states of the game space are displayed on the display unit according to an imaging position corresponding to a single object selected from among the above-described plurality of objects (including a player object). In other words, there is a display embodiment in which game images captured at the plurality of imaging positions are displayed in the imaging order.

As mentioned above, as one aspect of the second embodiment, since the user terminal 20B is configured to include the mode setting unit 31, the imaging unit 32B, and the display control unit 33, it is possible to display a game image which may interest the user on the display unit by executing the scenery mode, for example, even in a situation in which a player object is scarcely operated.

A plurality of objects in the above-described example of the second embodiment include a player object, player objects of other users, enemy objects, and objects of a light, a doorbell, and the like.

As a game image displayed in the scenery mode in the above-described example of the second embodiment, for example, there is a game image including a single object selected from among a plurality of objects (including a player object). In this case, a direction of the virtual camera may be determined so that the single object is included in the game image. A direction of the virtual camera may be determined on the basis of a relationship with an imaging position, for example, if a point of gaze is set in each of a plurality of objects in a fixed manner.

A plurality of imaging positions in the above-described example of the second embodiment may be determined in a one-to-one correspondence relationship with each object, and two or more imaging positions may be determined on the basis of a single object. Alternatively, a single imaging position may be determined on the basis of positions of two or more objects. In this case, an intermediate position between the positions of the two more objects may be used as an imaging position. Also in this case, a direction of the virtual camera is determined on the basis of a relationship with the imaging position if a point of gaze is set in each of a plurality of objects in a fixed manner. For example, an intermediate position between points of gaze which are respectively set in two or more objects for determining an imaging position may be used as a point of gaze.

Third Embodiment

Figure 7:
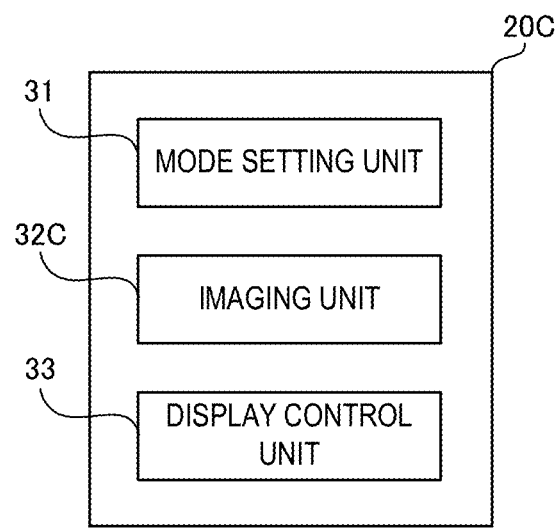
FIG. 7 is a block diagram illustrating a configuration of a user terminal corresponding to at least one embodiment of the present invention.

FIG. 7 is a block diagram illustrating a configuration of a user terminal 20C as an example of the user terminal 20. In this example, the user terminal 20C includes at least a mode setting unit 31, an imaging unit 32C, and a display control unit 33.

In the same manner as in the first embodiment, the mode setting unit 31 sets a display mode of a game image displayed on the display unit out of at least the normal mode and the scenery mode. The imaging unit 32C controls a virtual camera. In a case where the display mode is the normal mode, the imaging unit 32C causes the virtual camera which is disposed on the basis of a position of a player object, to perform imaging. In a case where a display mode is the scenery mode, the imaging unit 32C causes the virtual camera to perform imaging at a plurality of imaging positions in a game space. The imaging unit 32C uses at least some objects among a plurality of objects (including a player object) disposed in a game space as subject objects imaged by the virtual camera, and determines a plurality of imaging positions on the basis of positions of the respective subject objects. The imaging unit 32C determines a direction of the virtual camera at each imaging position on the basis of the position of the subject object so that at least a part of the subject object is included in a game image.

In the same manner as in the first embodiment, the display control unit 33 displays a game image captured by the virtual camera on the display unit, and, particularly, in a case where the display mode is the scenery mode, the display control unit 33 displays game images captured at a plurality of imaging positions on the display unit in a predetermined display embodiment.

Figure 8:
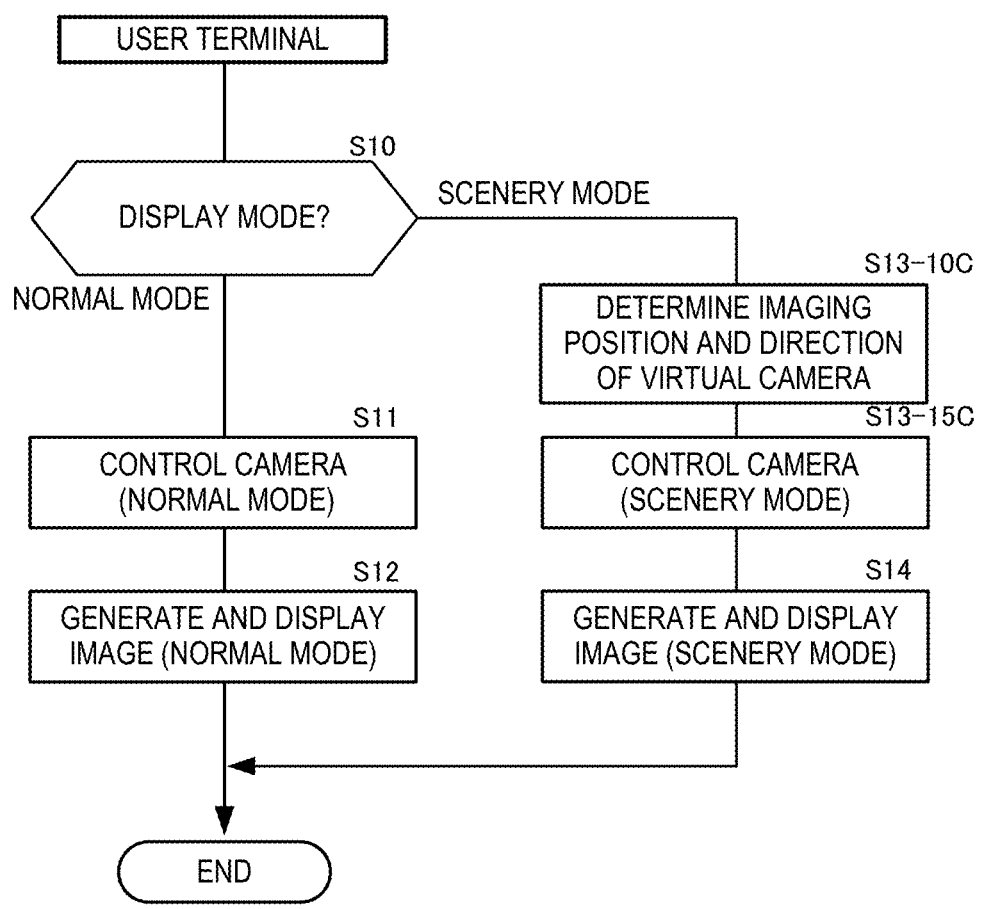
FIG. 8 is a flowchart illustrating an example of an imaging display process corresponding to at least one embodiment of the present invention.

FIG. 8 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20C performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20C receives information regarding a video game from the video game processing server 10 before performing the imaging display process.

In the imaging display process, the user terminal 20C determines whether the display mode is the normal mode or the scenery mode (step S10). If it is determined that the display mode is the normal mode (step S10: normal mode), the user terminal 20C controls the virtual camera in the normal mode (step S11). Thereafter, the user terminal 20C generates an image (game image) of a game space captured by the virtual camera through the process in step S11, and displays the game image on the display unit (step S12).

On the other hand, if it is determined that the display mode is the scenery mode through the process in step S10, the user terminal 20C determines an imaging position and a direction of the virtual camera (step S13-10C). For example, a single imaging position (viewpoint position) is determined (calculated) on the basis of a position of one of subject objects. For example, the imaging position is calculated by randomly selecting one of positions which are separated from the position of the single subject object (one of the subject objects) by a predetermined distance. A direction of the virtual camera is determined on the basis of the determined imaging position and a point of gaze which is set in the single subject object in advance. Next, the user terminal 20C controls the virtual camera in the scenery mode (step S13-15C). For example, imaging in the virtual camera is performed at the imaging position determined through the process in step S13-10C and in the direction of the virtual camera determined through the process in step S13-10C.

Thereafter, the user terminal 20C generates an image (game image) of the game space including the subject object, captured by the virtual camera through the process in step S13-15C, and displays the game image on the display unit (step S14). The above-described process is repeatedly performed in the scenery mode, and, thus, for example, various states of the subject object are displayed on the display unit according to an imaging position corresponding to a single subject object selected from among the above-described subject objects. In other words, there is a display embodiment in which game images captured at the plurality of imaging positions are displayed in the imaging order.

As mentioned above, as one aspect of the third embodiment, since the user terminal 20C is configured to include the mode setting unit 31, the imaging unit 32C, and the display control unit 33, it is possible to display various subject objects (game images) which may interest the user on the display unit by executing the scenery mode, for example, even in a situation in which a player object is scarcely operated.

A plurality of imaging positions in the above-described example of the third embodiment may be determined in a one-to-one correspondence relationship with each subject object, and two or more imaging positions may be determined on the basis of a single subject object. Alternatively, a single imaging position may be determined on the basis of positions of two or more subject objects.

Fourth Embodiment

Figure 9:
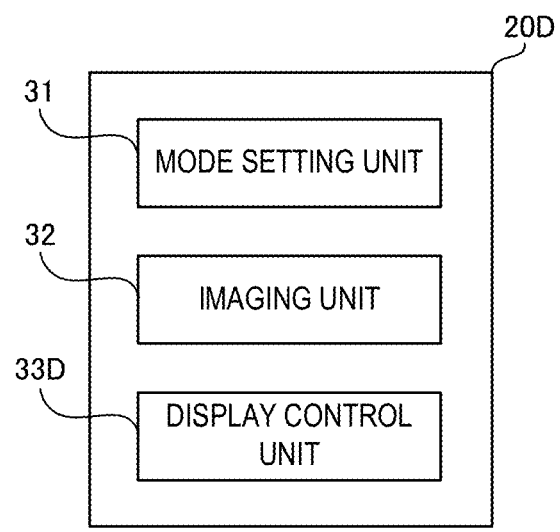
FIG. 9 is a block diagram illustrating a configuration of a user terminal corresponding to at least one embodiment of the present invention.

FIG. 9 is a block diagram illustrating a configuration of a user terminal 20D as an example of the user terminal 20. In this example, the user terminal 20D includes at least a mode setting unit 31, an imaging unit 32, and a display control unit 33D.

In the same manner as in the first embodiment, the mode setting unit 31 sets a display mode of a game image displayed on the display unit out of at least the normal mode and the scenery mode. The imaging unit 32 controls a virtual camera in the same manner as in the first embodiment. In a case where a display mode is the scenery mode, the imaging unit 32 causes the virtual camera to perform imaging at a plurality of imaging positions in a game space. The display control unit 33D displays a game image captured by the virtual camera on the display unit. Particularly, in a case where the display mode is the scenery mode, the display control unit 33D displays game images captured at a plurality of imaging positions on the display unit in a predetermined display embodiment. In the example of the fourth embodiment, there is a display embodiment in which the game images captured at the plurality of imaging positions are displayed in a predetermined order.

Figure 10:
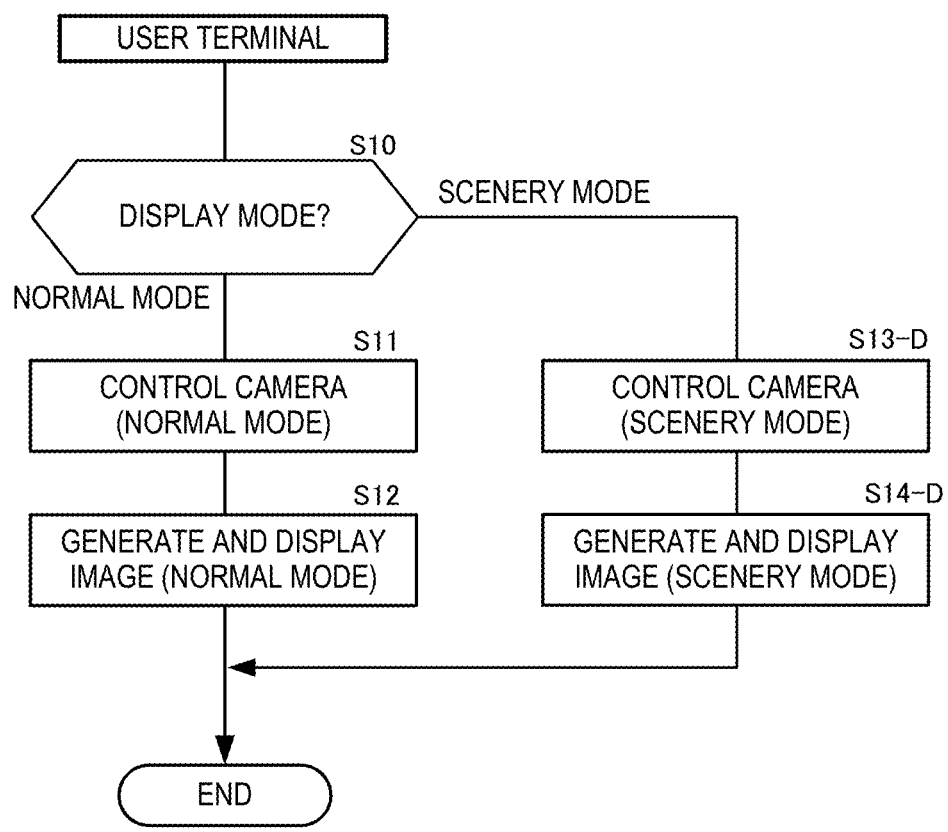
FIG. 10 is a flowchart illustrating an example of an imaging display process corresponding to at least one embodiment of the present invention.

FIG. 10 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20D performs the imaging display process. A flowchart illustrating an operation of the video game processing server 10 will not be described from the viewpoint of avoiding repeated description.

The imaging display process of this example is repeatedly performed in the unit of one frame (for example, ¹/₆₀ seconds) from starting of display of a game space and ending thereof. The user terminal 20D receives information regarding a video game from the video game processing server 10 before performing the imaging display process.

In the imaging display process, the user terminal 20D determines whether the display mode is the normal mode or the scenery mode (step S10). If it is determined that the display mode is the normal mode (step S10: normal mode), the user terminal 20D controls the virtual camera in the normal mode (step S11). Thereafter, the user terminal 20D generates an image (game image) of a game space captured by the virtual camera through the process in step S11, and displays the game image on the display unit (step S12).

On the other hand, if it is determined that the display mode is the scenery mode through the process in step S10, the user terminal 20D controls the virtual camera in the scenery mode (step S13-D). For example, one of a plurality of imaging positions in the game space is selected, and imaging in the virtual camera is performed at the selected imaging position (viewpoint position). Thereafter, the user terminal 20D generates an image (game image) of the game space captured by the virtual camera through the process in step S13-D, and displays the game image on the display unit (step S14-D). The above-described process is repeatedly performed in the scenery mode, and, thus, for example, various states of the game space are displayed on the display unit according to an imaging position selected from among a plurality of imaging positions in the game space. In other words, there is a display embodiment in which game images captured at the plurality of imaging positions are displayed in the imaging order.

As mentioned above, as one aspect of the fourth embodiment, since the user terminal 20D is configured to include the mode setting unit 31, the imaging unit 32, and the display control unit 33D, it is possible to display, in a predetermined order, game images at a plurality of imaging positions which may interest the user on the display unit by executing the scenery mode, for example, even in a situation in which a player object is scarcely operated.

In the above-described example of the fourth embodiment, imaging may be performed simultaneously at a plurality of imaging positions by using a plurality of virtual cameras in the process in step S13-D. In this case, in the process in step S14-D, game images obtained at the respective imaging positions may be displayed in a predetermined order. The predetermined order may be, for example, an order which is determined at random, and may be a preset order.

Fifth Embodiment

Figure 11:
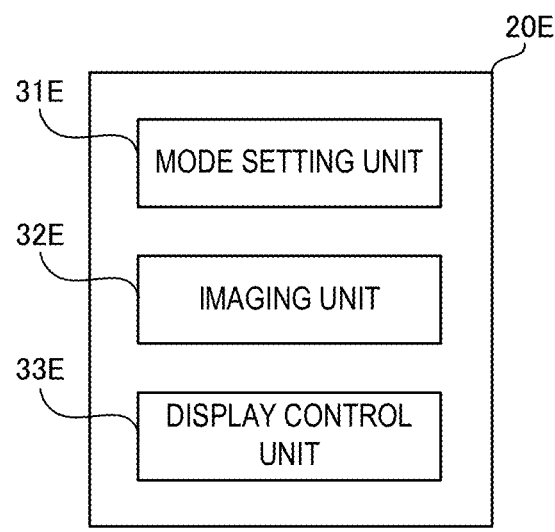
FIG. 11 is a block diagram illustrating a configuration of a user terminal corresponding to at least one embodiment of the present invention.

FIG. 11 is a block diagram illustrating a configuration of a user terminal 20E as an example of the user terminal 20. In this example, the user terminal 20E includes at least a mode setting unit 31E, an imaging unit 32E, and a display control unit 33E.

The mode setting unit 31E sets a display mode of a game image displayed on the display unit out of at least the normal mode and the scenery mode according to a preset predetermined condition. The predetermined condition includes history in which a user has selected each mode by operating the operation unit. The predetermined condition includes history in which a player object is passively moved in a case where the display mode is set (changed) from the scenery mode to the normal mode. The player object being passively moved indicates that the player object is moved without a user's operation. For example, the case corresponds to a case where the player object is moved by being influenced by operations of other objects. The mode setting unit 31E determines the passive movement, for example, on the basis of a change in position information of the player object.

The predetermined condition includes history in which a status of the player object becomes a predetermined status in a case where the display mode is set (changed) from the scenery mode to the normal mode. The predetermined status is, for example, a status in a fighting mode (during fighting) in which the player object fights an enemy object. The status of the player object is managed by the user terminal 20E along with parameters such as vitality of the player object. A display mode during starting of playing of a game is initially set to the normal mode.

The imaging unit 32E controls a virtual camera. In a case where a display mode is the normal mode, the imaging unit 32E causes the virtual camera which is disposed on the basis of a position of the player object, to perform imaging. In the example of the present embodiment, imaging is performed by the virtual camera disposed at a position (basic position) which is separated from a position of the player object by a predetermined distance obliquely upward on the back face thereof. Consequently, in the normal mode, a state of the back face of the player object and a state of the vicinity of the player object are displayed on the display unit as a game image. In the example of the present embodiment, a position (coordinate information) near the foot of the player object is set as a position of the player object. A point of gaze is set in correlation with the position of the player object. For example, the point of gaze is set at the central position of the player object. A position of the virtual camera in the normal mode may be changed from the basic position through a user's operation.

Figure 12:
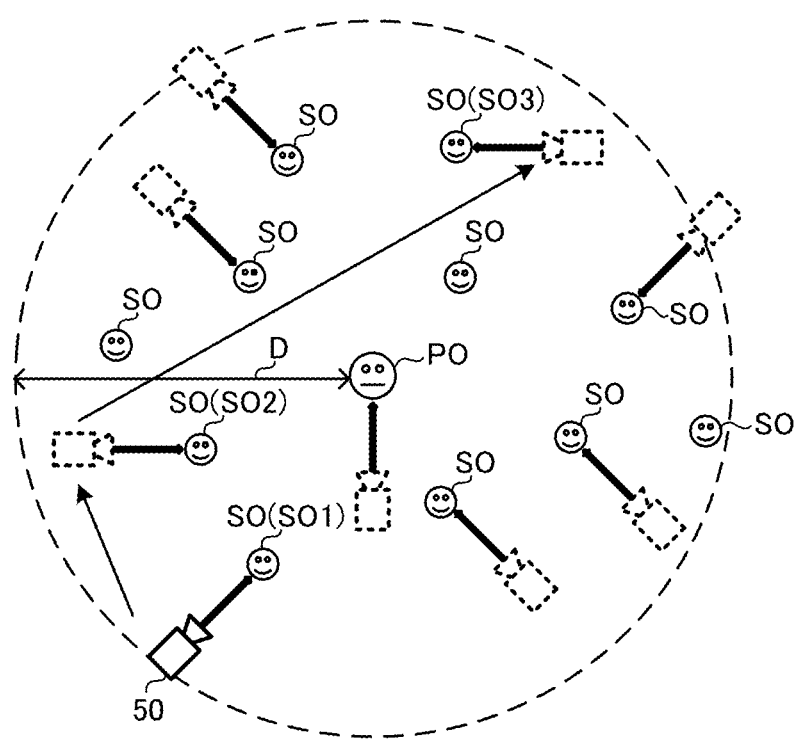
FIG. 12 is a plan view illustrating a game space generated by a game terminal corresponding to at least one embodiment of the present invention.

In a case where the display mode is the scenery mode, the imaging unit 32E causes the virtual camera to perform imaging at a plurality of imaging positions in a game space. In the example of the present embodiment, the display mode is the scenery mode, and, among a plurality of objects (including a player object) disposed in a game space as illustrated in FIG. 12, objects located within a predetermined range (predetermined distance D) from a player object PO are imaged at random as subject objects SO. In the example of the present embodiment, imaging time at a single imaging position is set to a predetermined time period (for example, for 10 seconds). In other words, imaging positions (subject objects SO) are changed every ten seconds. FIG. 12 is a plan view in which the game space is viewed from the top.

A plurality of imaging positions are correlated with the subject objects SO in a one-to-one relationship, and are determined (calculated) on the basis of a position and a direction of the corresponding subject object SO, and an imaging pattern (imaging candidate information). The imaging pattern includes information for calculating an imaging position on the basis of the position and the direction of the subject object SO. For example, information regarding a distance R between the imaging position and the position of the subject object SO is included, but has a general configuration, and thus detailed description thereof will be omitted.

The storage unit of the user terminal 20E stores a plurality of imaging patterns. The imaging unit 32E determines an imaging position on the basis of a single imaging pattern which is randomly selected, and the position and the direction of the subject object SO. If at least some of the subject object SO are imaged so as to be included in a game image, an imaging position may not be determined by using the above-described plurality of imaging patterns.

In a case where the display mode is the scenery mode, a direction of a virtual camera 50 is determined on the basis of a point of gaze set in the subject object SO and an imaging position. Also regarding the point of gaze, a plurality of candidate points are prepared in relation to a single subject object SO, and, for example, a candidate point which is randomly selected from the plurality of candidate points may be used as the point of gaze.

In a case where the display mode is the scenery mode, for example, in the game space illustrated in FIG. 12, a subject object SO1 is randomly selected from among the plurality of subject objects SO, and imaging is performed by the virtual camera 50 at the calculated imaging position for the imaging time period (for ten seconds). Next, a subject object SO2 and a subject object SO3 are randomly selected in this order and are imaged.

The display control unit 33E displays a game image captured by the virtual camera 50 on the display unit. In a case where the display mode is the normal mode, as described above, the game image including a state of the back face side of the player object PO and the vicinity of the player object PO is displayed. Therefore, a user can recognize the state of the vicinity of the player object PO from the game image in a case where the user moves the player object PO and causes the game to progress.

In a case where the display mode is the scenery mode, the display control unit 33E sequentially displays game images generated through imaging at the respective imaging positions on the display unit. In other words, the displayed subject objects SO are changed whenever ten seconds elapse so that imaging positions are changed. In the example illustrated in FIG. 12, the subject objects SO1, SO2 and SO3 are displayed in this order whenever ten seconds elapse. Therefore, the user can enjoy watching states of the various subject objects SO of the game space in which the player object PO is present.

Next, a description will be made of an operation of the game system 100 (system 100) of this embodiment.

Figure 13:
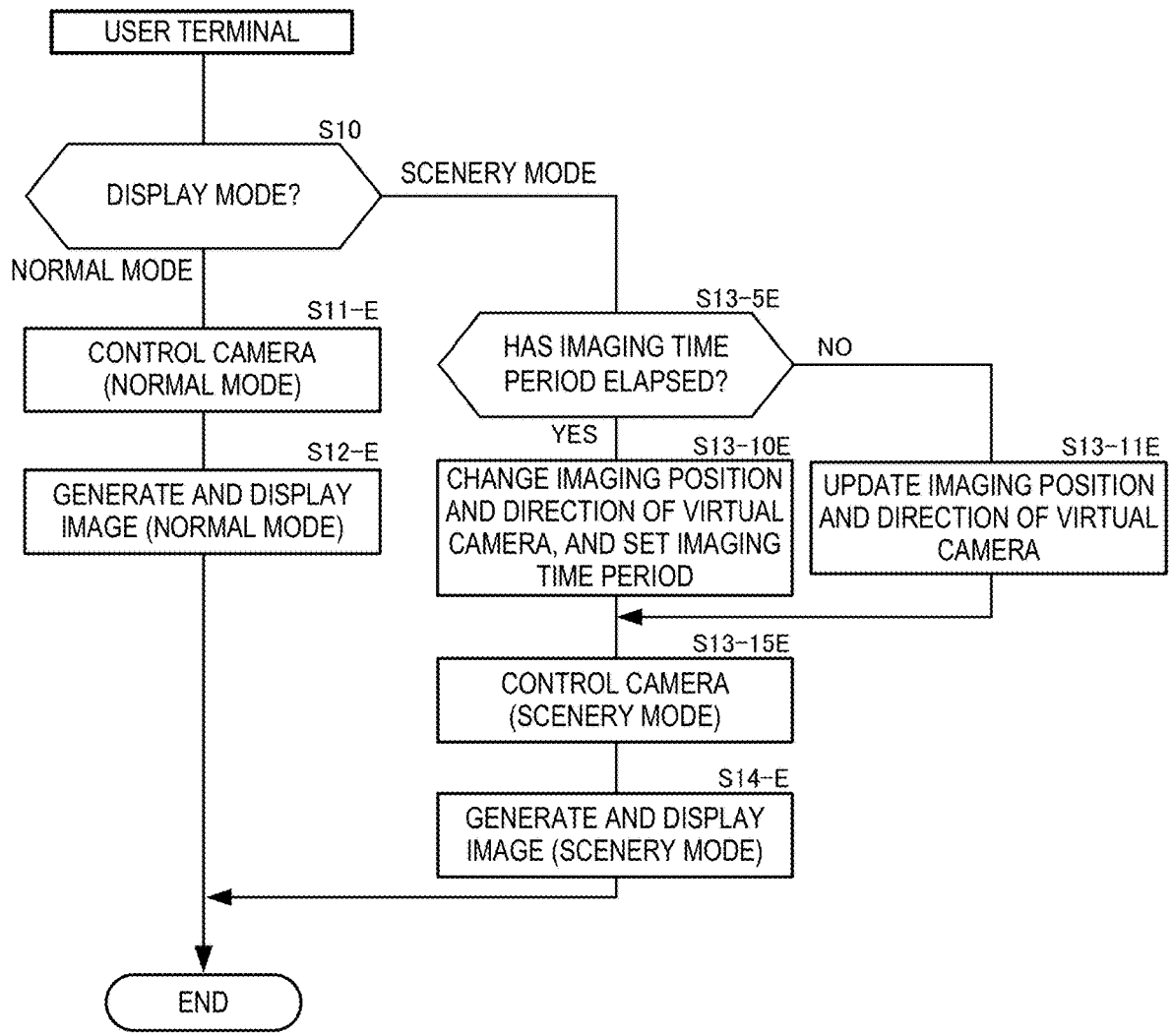
FIG. 13 is a flowchart illustrating an example of an imaging display process corresponding to at least one embodiment of the present invention.

FIG. 13 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20E performs the imaging display process. A flowchart illustrating an operation of the video game processing server 10 will not be described from the viewpoint of avoiding repeated description.

The imaging display process of this example is repeatedly performed in the unit of one frame (for example, $\frac{1}{60}$ seconds) from starting of display of a game space and ending thereof. The user terminal 20E receives information regarding a video game from the video game processing server 10 before performing the imaging display process.

In the imaging display process, the user terminal 20E determines whether the display mode is the normal mode or the scenery mode (step S10). If it is determined that the display mode is the normal mode (step S10: normal mode), the user terminal 20E controls the virtual camera 50 in the normal mode (step S11-E). As described above, a position and a direction of the virtual camera 50 are determined on the basis of a position of the player object PO so that the back of the player object PO and the vicinity of the player object PO are included in a game image, and imaging is performed. Thereafter, the user terminal 20E generates an image (game image) of a game space captured by the virtual camera 50 through the process in step S11-E, and displays the game image on the display unit (step S12-E).

On the other hand, if it is determined that the display mode is the scenery mode through the process in step S10, the user terminal 20E determines whether or not an imaging time period has elapsed (step S13-5E). If it is determined that the imaging time period has elapsed (step S13-5E: YES), the user terminal 20E determines a single imaging position (viewpoint position) among a plurality of imaging positions and a direction of the virtual camera 50, and sets a new imaging time period (step S13-10E). In other words, the imaging time period has elapsed, and thus the next imaging position is determined. In the example of the present embodiment, a single subject object SO is randomly selected from among a plurality of subject objects SO, and a single imaging pattern is randomly selected. A single imaging position is determined on the basis of a position and a direction of the selected subject object SO and the selected imaging pattern. A direction of the virtual camera 50 is determined on the basis of the imaging position and a point of gaze set in the selected subject object SO. Regarding setting of an imaging time period, for example, a current time point indicating starting of imaging is set.

Next, the user terminal 20E controls the virtual camera 50 in the scenery mode (step S13-15E). For example, imaging is performed by the virtual camera 50 at the imaging position determined through the process in step S13-10E (or step S13-11E) and in the direction of the virtual camera 50 determined through the process in step S13-10E (or step S13-11E). Thereafter, the user terminal 20E generates an image (game image) captured by the virtual camera 50 through the process in step S13-15E, and displays the game image on the display unit (step S14-E).

If it is determined that the imaging time period has not elapsed through the process in step S13-5E, the user terminal 20E updates the imaging position and the direction of the virtual camera 50 for the currently selected subject object SO (step S13-11E). In other words, the single imaging position is updated on the basis of the position and the direction of the currently selected subject object SO and the currently selected imaging pattern. That is, the imaging position is updated according to movement of the currently selected subject object SO. Next, the user terminal 20E performs the processes in steps S13-15E and S14-E.

The processes in the scenery mode are repeatedly performed in the above-described manner, and thus the respective subject objects SO are displayed in order whenever an imaging time period elapses as described above.

As mentioned above, as one aspect of the fifth embodiment, since the user terminal 20E is configured to include the mode setting unit 31E, the imaging unit 32E, and the display control unit 33E, it is possible to display, in a predetermined order, various subject objects (game images) which may interest the user on the display unit by executing the scenery mode, for example, even in a situation in which a player object is scarcely operated.

A plurality of imaging positions in the above-described example of the fifth embodiment may be determined in a one-to-one correspondence relationship with each subject object, but two or more imaging positions may be determined on the basis of a single subject object. Alternatively, a single imaging position may be determined on the basis of positions of two or more subject objects.

In the above-described example of the fifth embodiment, selection of a subject object is performed at random but is not particularly limited thereto. For example, priority information may be set in respective subject objects, and the subject object may be selected in the high priority order.

In the above-described example of the fifth embodiment, in the scenery mode, a single virtual camera is moved to a plurality of imaging positions, and performs imaging, but virtual cameras may be disposed at the plurality of imaging positions, the respective virtual cameras may simultaneously perform imaging, and only game images displayed on the display unit may be changed whenever a predetermined time period elapses. All game images obtained through simultaneous imaging in the virtual cameras may be simultaneously displayed on the display unit.

In the above-described example of the fifth embodiment, objects located within a predetermined range from a player object are used as subject objects, but all the objects located within the predetermined range may not be used, that is, some thereof may be used as subject objects.

Sixth Embodiment

Figure 14:
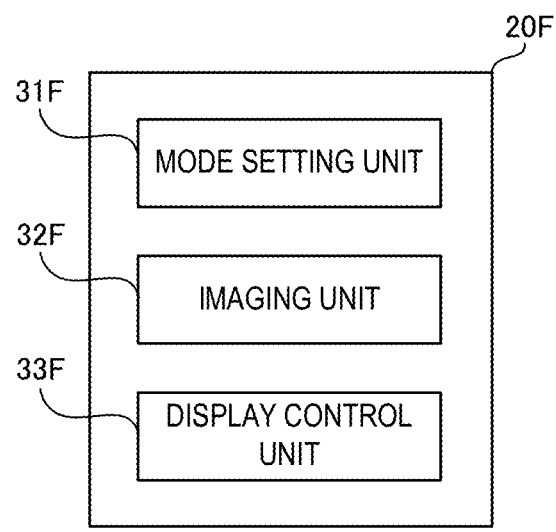
FIG. 14 is a block diagram illustrating a configuration of a user terminal corresponding to at least one embodiment of the present invention.

FIG. 14 is a block diagram illustrating a configuration of a user terminal 20F as an example of the user terminal 20. In this example, the user terminal 20F includes at least a mode setting unit 31F, an imaging unit 32F, and a display control unit 33F.

The mode setting unit 31F sets a display mode of a game image displayed on the display unit out of at least the normal mode, the scenery mode, and an automatic movement mode according to a preset predetermined condition. The automatic movement mode is a mode in which a player object PO rides on a ride object RO (refer to FIGS. 15A and 15B), and is carried (moved) to a destination in a game space. A movement operation on the ride object RO performed by a user cannot be accepted during movement in the automatic movement mode.

The predetermined condition in a case where the display mode is set from the normal mode to the automatic movement mode includes history in which the user performs an operation so that the player object PO rides on the ride object RO. The predetermined condition in a case where the display mode is set (changed) from the automatic movement mode to the normal mode includes history in which the ride object RO (player object PO) arrives at a destination. In the example of the present embodiment, setting from the scenery mode to the automatic movement mode, and setting from the automatic movement mode to the scenery mode are not performed.

The imaging unit 32F controls the virtual camera 50. In a case where a display mode is the normal mode, the imaging unit 32F causes the virtual camera 50 which is disposed on the basis of a position of the player object PO, to perform imaging. In a case where a display mode is the scenery mode, the imaging unit 32F causes the virtual camera 50 to perform imaging at a plurality of imaging positions in a game space. In a case where a display mode is the automatic movement mode, as illustrated in FIGS. 15A and 15B, the imaging unit 32F causes the virtual camera 50 to perform imaging in a state in which a position and a direction of the virtual camera 50 before starting of movement are maintained during the movement.

Figure 15A:
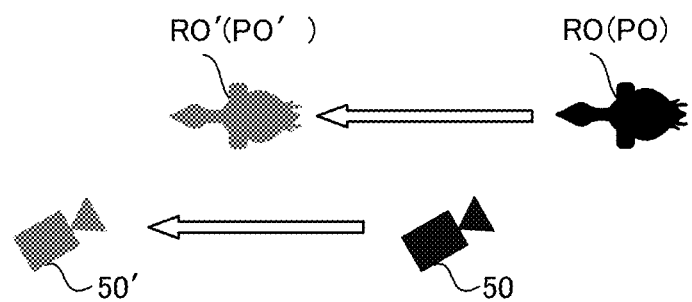
FIGS. 15A and 15B are respectively a plan view and a side view illustrating a game space generated by a game terminal corresponding to at least one embodiment of the present invention.

FIG. 15A is a plan view in which a game space including the player object PO and the ride object RO is viewed from the top. FIG. 15B is a side view in which the game space including the player object PO and the ride object RO illustrated in FIG. 15A is viewed from the side. FIGS. 15A and 15B illustrate a state in which the player object PO rides on the ride object RO, and the display mode is set to the automatic movement mode.

Figure 15B:
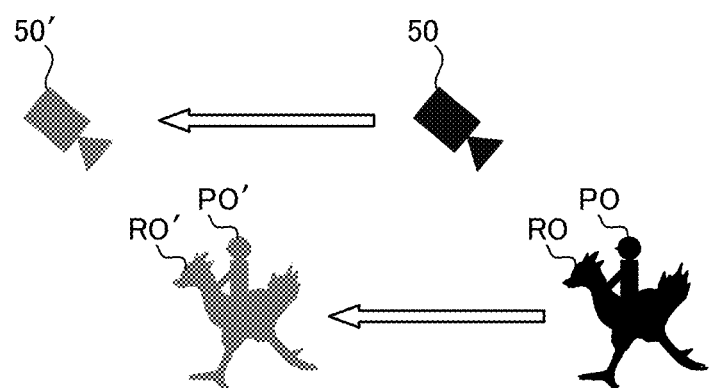

As illustrated in FIGS. 15A and 15B, even in a case where the ride object RO (player object PO) is moved to a position of a ride object RO' (player object PO'), a position and a direction of the virtual camera 50 relative to the player object PO are maintained at all times. In other words, the virtual camera 50 is moved in tracking of movement of the ride object RO (player object PO).

In the example of the present embodiment, the user can operate the operation unit so as to change a position and a direction of the virtual camera 50 before movement of the ride object RO is started. Changed position and direction of the virtual camera 50 are maintained even if movement of the ride object RO is thereafter started. In other words, in the example of the present embodiment, a position and a direction of the virtual camera 50 can be maintained to be a position and a direction intended by the user even during movement of the ride object RO.

In the related art, if movement of a ride object is started, for example, a virtual camera is forced to be moved so as to go around to the back face of a player object (ride object) from the present position in accordance with the movement of the ride object while a height position of the virtual camera is maintained. Finally, the virtual camera is moved to the back face side (rear side) of the player object, and images a state of a game space in an advancing direction (front side), including the player object (ride object). This is common to a case where a user can operate movement of a ride object on which a player object rides. In the case where movement of the ride object is operated by the user, a state of a game space in an advancing direction is displayed on a display unit, and thus the user easily performs a movement operation. However, in a case where the user does not operate movement of the ride object, it is desired that, rather than the state of the game space in the advancing direction is displayed, the user can enjoy watching a state of movement of the ride object (player object) from a viewpoint position desired by the user, or the user can capture a picture of the player object (ride object) from a viewpoint position desired by the user by using a picture (still image) capturing function.

The display control unit 33F displays a game image captured by the virtual camera 50 on the display unit. In a case where the display mode is the scenery mode, the display control unit 33F displays game images captured at a plurality of imaging positions on the display unit in a predetermined display embodiment.

Next, a description will be made of an operation of the game system 100 (system 100) of this embodiment.

Figure 16:
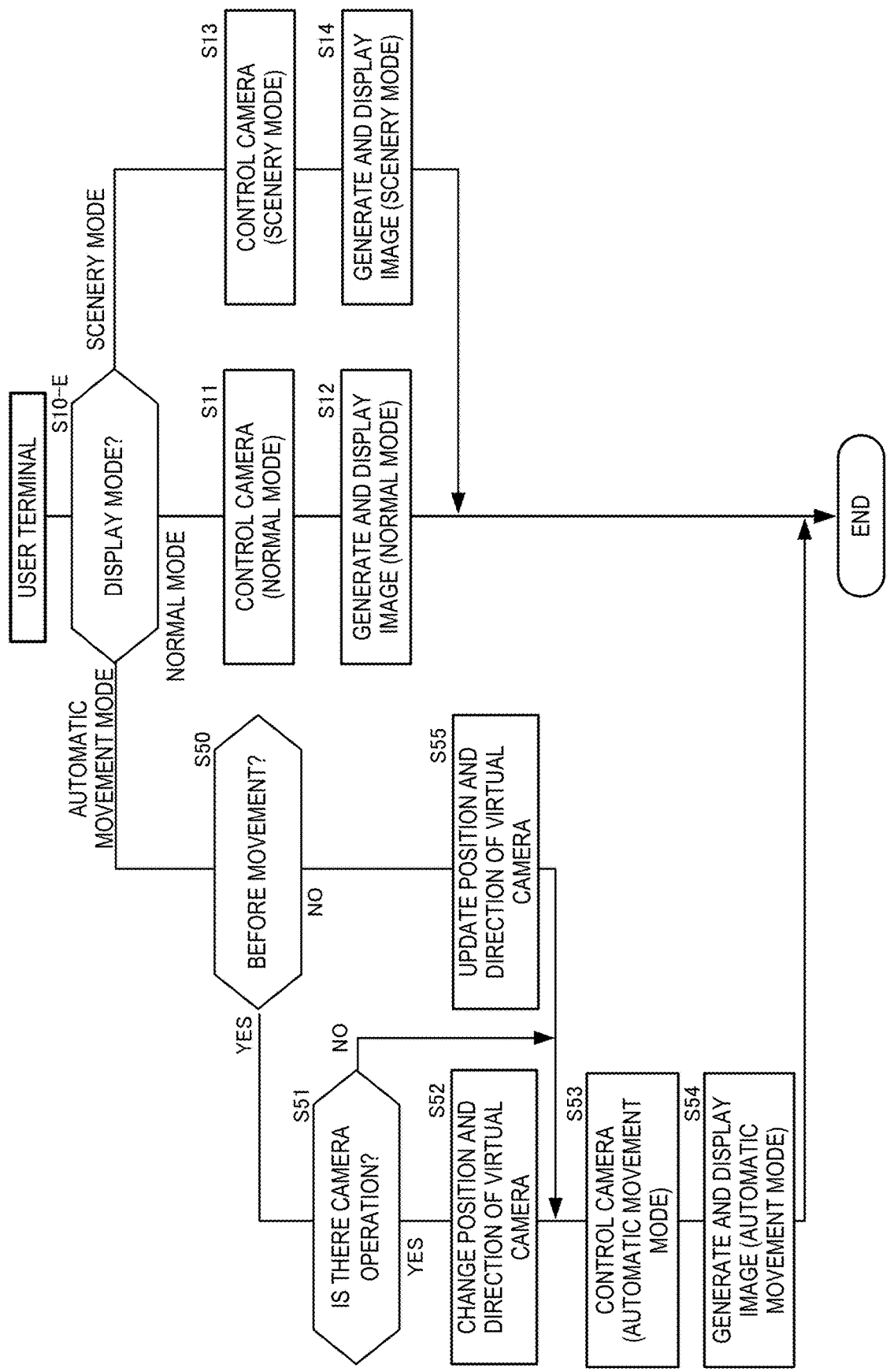
FIG. 16 is a flowchart illustrating an example of an imaging display process corresponding to at least one embodiment of the present invention.

FIG. 16 is a flowchart illustrating an example of an imaging display process performed by the system 100. In the imaging display process of this example, a process of controlling imaging in the virtual camera and display of a game image, corresponding to the above-described display mode, is performed. Hereinafter, as an example, a description will be made of a case where the user terminal 20F performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20F receives information regarding a video game from the video game processing server 10 before performing the imaging display process.

In the imaging display process, the user terminal 20F determines whether the display mode is any one of the normal mode, the scenery mode, and the automatic movement mode (step S10-F). For example, the determination is performed on the basis of mode information set by the mode setting unit 31F. If it is determined that the display mode is the normal mode and the scenery mode, the user terminal 20F performs processes in steps S11 to S14 in the same manner as in the first embodiment.

If it is determined that the display mode is the automatic movement mode (step S10-F: automatic movement mode), the user terminal 20F determines whether or not movement of the ride object RO is before being started (step S50). If it is determined that the movement is before being started (step S50: YES), the user terminal 20F determines whether or not there is a camera operation on the operation unit from the user (step S51). If it is determined that there is no camera operation (step S51: NO), the user terminal 20F proceeds to a process in step S53. On the other hand, if it is determined that there is the camera operation (step S51: YES), the user terminal 20F changes a position and a direction of the virtual camera 50 relative to the player object PO on the basis of the user's operation content (operation signal) on the operation unit (step S52).

The virtual camera is controlled in the automatic movement mode (step S53). For example, imaging is performed at the position of the virtual camera 50 and in the direction thereof, changed (or updated) through the process in step S52 (or step S55). In a case where there is no camera operation (step S51: NO), imaging is performed in the previous position and direction of the virtual camera 50. The user terminal 20F generates an image (game image) of a game space captured by the virtual camera 50 through the process in step S53, and displays the game image on the display unit (step S54).

If it is determined that movement is in progress through the process in step S50, the user terminal 20F updates the position and the direction of the virtual camera 50 in accordance with the movement of the player object PO (step S55). In other words, an imaging position and a direction of the virtual camera 50 are updated while maintaining a relative positional relationship with the player object PO in accordance with a movement amount and a movement direction of the player object PO. Thereafter, processes in steps S53 and S54 are performed.

As mentioned above, as one aspect of the sixth embodiment, since the user terminal 20F is configured to include the mode setting unit 31F, the imaging unit 32F, and the display control unit 33F, it is possible to display a game image which may interest the user on the display unit by executing the scenery mode, for example, even in a situation in which a player object is scarcely operated.

In the automatic movement mode, the user can enjoy watching movement of the ride object RO and the player object PO at a position of the virtual camera 50 and in a direction thereof preferred by the user. In other words, the automatic movement mode realizes a function of enabling a state of movement of the ride object RO and the player object PO to be displayed as a user's favorite image (game image). A user's favorite game image can be captured as a picture by using a picture capturing function.

The ride object in the above-described example of the sixth embodiment is not particularly limited as long as a player object rides on the object and moves to other destinations. The ride object may be, for example, a flying boat object or a sailing ship object.

Seventh Embodiment

Figure 17:
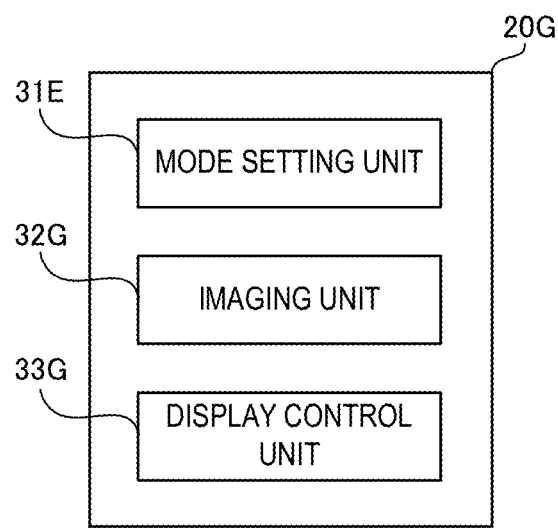
FIG. 17 is a block diagram illustrating a configuration of a user terminal corresponding to at least one embodiment of the present invention.

FIG. 17 is a block diagram illustrating a configuration of a user terminal 20G as an example of the user terminal 20. In this example, the user terminal 20G includes at least a mode setting unit 31E, an imaging unit 32G, and a display control unit 33G.

As described in the fifth embodiment, the mode setting unit 31E sets the display mode of a game image displayed on the display unit out of at least the normal mode and the scenery mode according to a preset predetermined condition.

The imaging unit 32G controls the virtual camera 50. In a case where the display mode is the normal mode, the imaging unit 32G causes the virtual camera 50 which is disposed on the basis of a position of the player object PO, to perform imaging. In the example of the present embodiment, in the same manner as in the fifth embodiment, imaging is performed by the virtual camera 50 disposed at a position (basic position) which is separated from a position of the player object PO by a predetermined distance obliquely upward on the back face thereof.

Figure 18:
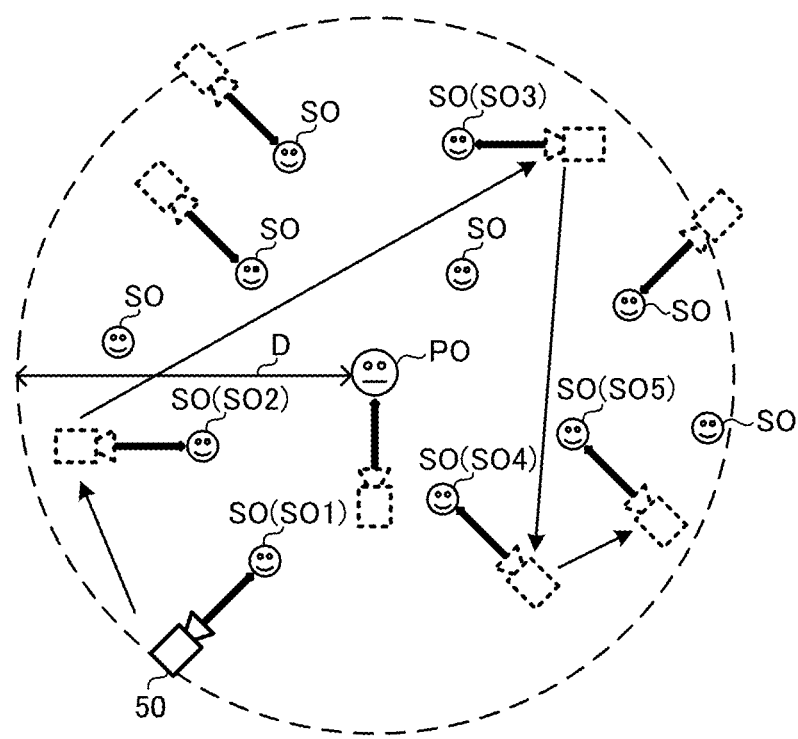
FIG. 18 is a plan view illustrating a game space generated by a user terminal corresponding to at least one embodiment of the present invention.

In a case where the display mode is the scenery mode, the imaging unit 32G causes the virtual camera 50 to perform imaging at a plurality of imaging positions in a game space. In the example of the present embodiment, in the same manner as in the fifth embodiment, in a case where the display mode is the scenery mode, among a plurality of objects (including a player object) disposed in a game space as illustrated in FIG. 18, objects located within a predetermined range (predetermined distance D) from the player object PO are imaged at random as subject objects SO. In the example of the present embodiment, imaging time at a single imaging position is fundamentally set to a predetermined time period (for example, for 10 seconds). In other words, imaging positions (subject objects SO) are changed every ten seconds. FIG. 18 is a plan view in which the game space is viewed from the top.

A plurality of imaging positions are correlated with the subject objects SO in a one-to-one relationship, and are determined (calculated) on the basis of a position and a direction of the corresponding subject object SO, and an imaging pattern (imaging candidate information). The imaging pattern includes information for calculating an imaging position on the basis of the position and the direction of the subject object SO. For example, information regarding a distance R between the imaging position and the position of the subject object SO is included, but has a general configuration, and thus detailed description thereof will be omitted.

The storage unit of the user terminal 20G stores a plurality of imaging patterns. The imaging unit 32G determines an imaging position on the basis of a single imaging pattern which is randomly selected, and the position and the direction of the subject object SO. If at least some of the subject objects SO are imaged so as to be included in a game image, an imaging position may not be determined by using the above-described plurality of imaging patterns.

In a case where the display mode is the scenery mode, a direction of a virtual camera 50 is determined on the basis of a point of gaze set in the subject object SO and an imaging position. Also regarding the point of gaze, a plurality of candidate points are prepared in relation to a single subject object SO, and, for example, a candidate point which is randomly selected from the plurality of candidate points may be used as the point of gaze.

In a case where the display mode is the scenery mode, for example, in the game space illustrated in FIG. 18, a subject object SO1 is randomly selected from the plurality of subject objects SO, and imaging is performed by the virtual camera 50 at the calculated imaging position for the imaging time period (for ten seconds). Next, subject objects SO2, SO3, SO4 and SO5 are randomly selected in this order and are imaged.

In the example of the present embodiment, in a case where there is a transition execution operation on the operation unit of the user terminal 20G from the user, the imaging unit 32G moves (skips) the virtual camera 50 from the present imaging position to the next imaging position regardless of elapse of an imaging time period. More specifically, the imaging unit 32G moves the present imaging position to the next imaging position whenever the transition execution operation is performed.

In a case where there is a transition stoppage operation on the operation unit of the user terminal 20G from the user, the imaging unit 32G stops movement of the virtual camera 50 from the present imaging position to the next imaging position regardless of elapse of an imaging time period. In other words, if the transition stoppage operation is performed, the imaging unit 32G causes the virtual camera 50 to continuously perform imaging at the present imaging position regardless of elapse of an imaging time period. The imaging unit 32G cancels stoppage of movement of an imaging position in a case where, for example, a stoppage cancel operation is performed on the operation unit after the transition stoppage operation is performed.

In the example illustrated in FIG. 18, in a case where the transition execution operation is performed in a state in which the subject object SO2 is being imaged, the virtual camera 50 is moved to an imaging position of the next subject object SO3 even before an imaging time period of the subject object SO2 elapses. In a case where the transition execution operation is performed once more, the virtual camera 50 is moved from the subject object SO3 to an imaging position of the next subject object SO4.

Thereafter, in a case where the transition stoppage operation is performed in a state in which the subject object SO4 is being imaged, the virtual camera 50 continuously performs imaging (is not moved to an imaging position of the subject object SO5) at the imaging position of the subject object SO4 regardless of elapse of the imaging time period of the subject object SO4. Next, in a case where the stoppage cancel operation is performed, the transition stoppage operation is canceled, and, if the imaging time period of the subject object SO4 has elapsed, the virtual camera 50 is moved to the imaging position of the subject object SO5.

The display control unit 33G displays a game image captured by the virtual camera 50 on the display unit. In a case where the display mode is the scenery mode, the display control unit 33G sequentially displays game images generated through imaging at the respective imaging positions on the display unit. Fundamentally, the subject objects SO are changed and are displayed whenever ten seconds elapse so that imaging positions are changed. The subject objects SO are changed and are displayed whenever the user performs the transition execution operation. On the other hand, in a case where the user performs the transition stoppage operation, changing of the subject objects SO is stopped, and the present subject object SO is continuously displayed.

In the example illustrated in FIG. 18, the virtual camera 50 is moved on the basis of the elapse of an imaging time period, the transition execution operation, and the transition stoppage operation, and thus the subject objects SO1, SO2, SO3, SO4 and SO5 are displayed in order. Therefore, the user can enjoy watching states of the various subject objects SO of the game space in which the player object PO is present. For example, the user can skip display of the present game image by performing the transition execution operation in a case where the game image at an uninteresting camera angle is displayed while viewing game images which are changed every predetermined time. On the other hand, in a case where a game image at the present camera angle is desired to be watched a little more, the user can stop transition in an imaging position by performing the transition stoppage operation so as to continuously visually recognize the game image at the present camera angle.

Next, a description will be made of an operation of the game system 100 (system 100) of this embodiment.

Figure 19:
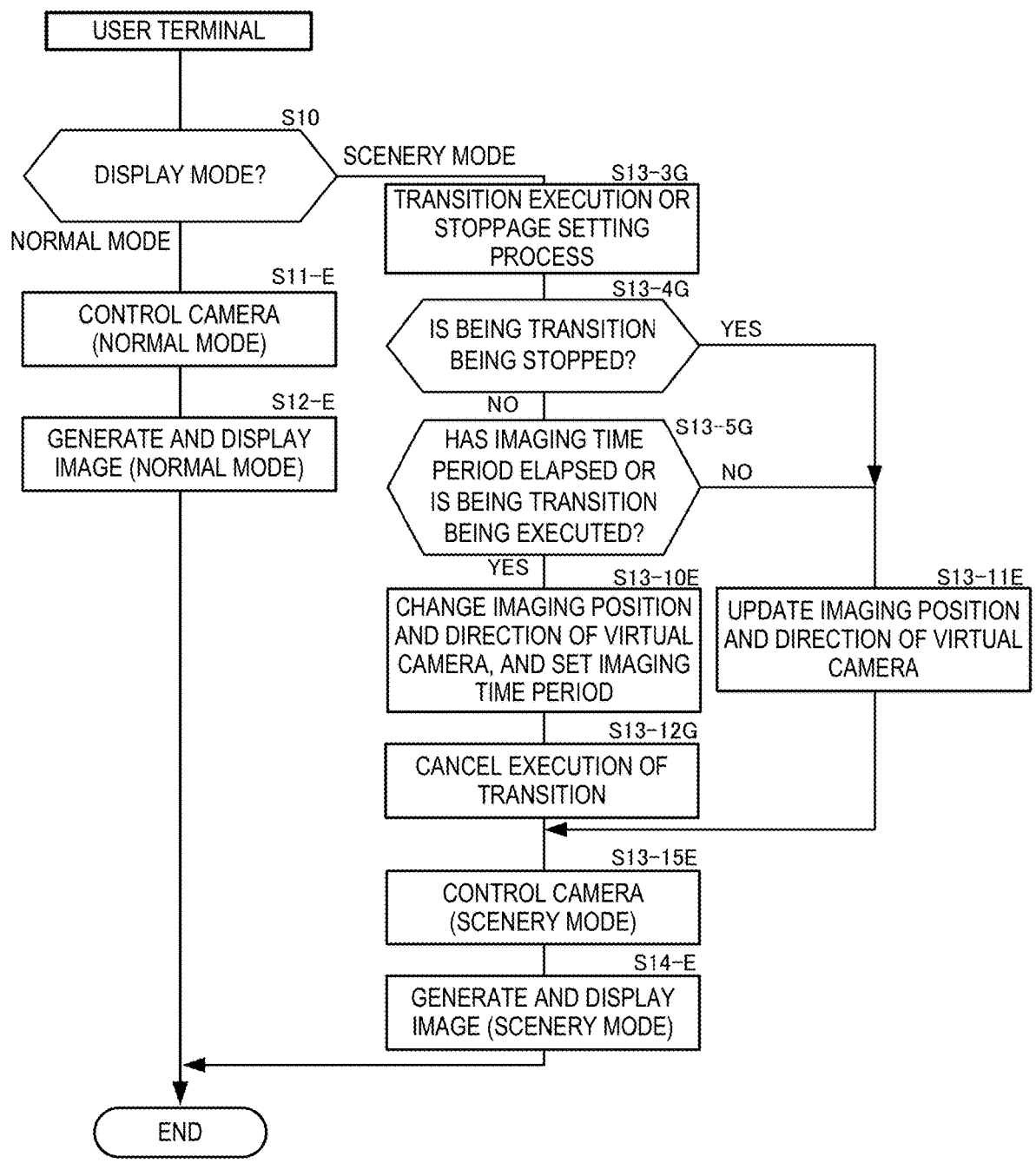
FIG. 19 is a flowchart illustrating an example of an imaging display process corresponding to at least one embodiment of the present invention.

FIG. 19 is a flowchart illustrating an example of an imaging display process performed by the system 100. In the imaging display process of this example, a process of controlling imaging in the virtual camera 50 and display of a game image, corresponding to the above-described display mode, is performed. Hereinafter, as an example, a description will be made of a case where the user terminal 20G performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20G receives information regarding a video game from the video game processing server 10 before performing the imaging display process.

In the imaging display process, the user terminal 20G determines whether the display mode is the normal mode or the scenery mode (step S10). If it is determined that the display mode is the normal mode (step S10: normal mode), the user terminal 20G controls the virtual camera 50 in the normal mode (step S11-E). As described above, a position and a direction of the virtual camera 50 are determined on the basis of a position of the player object PO so that the back of the player object PO and the vicinity of the player object PO are included in a game image, and imaging is performed. Thereafter, the user terminal 20G generates an image (game image) of a game space captured by the virtual camera 50 through the process in step S11-E, and displays the game image on the display unit (step S12-E).

On the other hand, if it is determined that the display mode is the scenery mode through the process in step S10, the user terminal 20G performs a process of setting execution and stoppage of transition in an imaging position (step S13-3G). Specifically, in a case where the transition execution operation is performed, the user terminal 20G sets a value of a transition execution flag to 1 (ON). In a case where the transition stoppage operation is performed, the user terminal 20G sets a value of a transition stoppage flag to 1 (ON). In a case where the transition cancel operation is performed, the user terminal 20G sets a value of the transition stoppage flag to 0 (OFF).

Next, the user terminal 20G determines whether or not transition is being stopped (step S13-4G). Specifically, if the transition stoppage flag is set to ON, the user terminal 20G determines that transition is being stopped. If it is determined that transition is being stopped (step S13-4G: YES), the user terminal 20G proceeds to a process in step S13-11E will be described later, and causes the virtual camera 50 to continuously perform imaging at the present imaging position.

On the other hand, if it is determined that transition is not being stopped (step S13-4G: NO), the user terminal 20G determines whether or not an imaging time period has elapsed or transition is being executed (step S13-5G). If the transition execution flag is set to ON, the user terminal 20G determines that transition is being executed. If it is determined that the imaging time period has elapsed, or transition is being executed (step S13-5G), the user terminal 20G determines a single imaging position (viewpoint position) among a plurality of imaging positions and a direction of the virtual camera 50, and sets a new imaging time period (step S13-10E). In other words, since the imaging time period has elapsed, or the transition execution operation is performed, changing to a new imaging position occurs.

In the example of the present embodiment, in the same manner as in the fifth embodiment, a single subject object SO is randomly selected from a plurality of subject objects SO, and a single imaging pattern is randomly selected. A single imaging position is determined on the basis of a position and a direction of the selected subject object SO and the selected imaging pattern. Regarding setting of an imaging time period, for example, a current time point indicating starting of imaging is set. The user terminal 20G sets the transition execution flag to OFF (1) so as to cancel execution of the transition (step S13-12G).

Next, the user terminal 20G controls the virtual camera 50 in the scenery mode (step S13-15E). For example, imaging is performed by the virtual camera 50 at the imaging position determined through the process in step S13-10E (or step S13-11E) and in the direction of the virtual camera 50 determined through the process in step S13-10E (or step S13-11E). Thereafter, the user terminal 20G generates an image (game image) of a game space captured by the virtual camera 50 through the process in step S13-15E, and displays the game image on the display unit (step S14-E).

If it is determined that the imaging time period has not elapsed and transition is not being executed through the process in step S13-5G, the user terminal 20G updates the imaging position and the direction of the virtual camera 50 for the currently selected subject object SO (step S13-11E). In other words, the single imaging position is updated on the basis of the position and the direction of the currently selected subject object SO and the imaging pattern. That is, the imaging position is updated according to movement of the subject object SO. Next, the user terminal 20G performs the processes in steps S13-15E and S14-E.

As mentioned above, as one aspect of the seventh embodiment, since the user terminal 20G is configured to include the mode setting unit 31E, the imaging unit 32G, and the display control unit 33G, it is possible to display, in a predetermined order, various subject objects (game images) which may interest the user on the display unit by executing the scenery mode, for example, even in a situation in which a player object is scarcely operated. Since an imaging position (subject object) can be skipped, or imaging can be continuously performed at a single imaging position through a user's operation (the transition execution operation and the transition stoppage operation), it is possible to display a more interesting game image on the display unit.

In the above-described example of the seventh embodiment, two operations such as the transition setting operation and the transition stoppage operation can be received, but there may be a configuration in which either one thereof can be received.

In the above-described example of the seventh embodiment, a transition stoppage state is canceled through the stoppage cancel operation, but the stoppage cancel operation may be omitted. For example, an imaging time period may be extended by a preset extension time period by performing the transition stoppage operation.

In the above-described example of the seventh embodiment, in the scenery mode, a single virtual camera 50 is moved to a plurality of imaging positions, and performs imaging, but virtual cameras 50 may be disposed at the plurality of imaging positions, the respective virtual cameras 50 may simultaneously perform imaging, and only game images displayed on the display unit may be changed whenever a predetermined time period elapses. In this case, display of the game image may be skipped or may be continuously performed in response to the transition execution operation and the transition stoppage operation.

Eighth Embodiment

Figure 20:
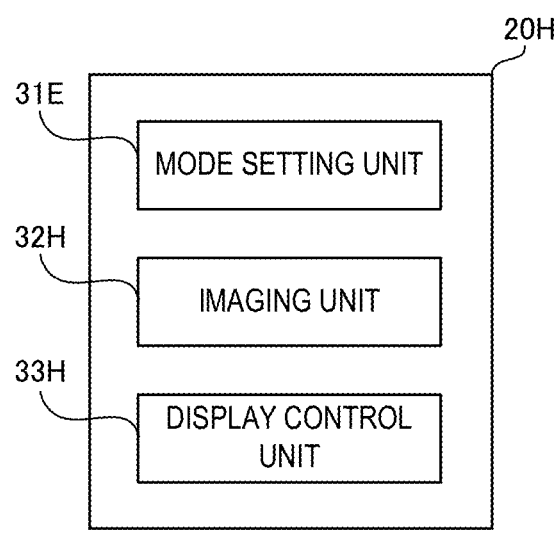
FIG. 20 is a block diagram illustrating a configuration of a user terminal corresponding to at least one embodiment of the present invention.

FIG. 20 is a block diagram illustrating a configuration of a user terminal 20H as an example of the user terminal 20. In this example, the user terminal 20H includes at least a mode setting unit 31E, an imaging unit 32H, and a display control unit 33H.

As described in the fifth embodiment, the mode setting unit 31E sets a display mode of a game image displayed on the display unit out of at least the normal mode and the scenery mode according to a preset predetermined condition.

The imaging unit 32H controls the virtual camera 50. In a case where the display mode is the normal mode, the imaging unit 32H causes the virtual camera 50 which is disposed on the basis of a position of the player object PO, to perform imaging. In the example of the present embodiment, in the same manner as in the fifth embodiment, imaging is performed by the virtual camera 50 disposed at a position (basic position) which is separated from a position of the player object PO by a predetermined distance obliquely upward on the back face thereof.

In a case where the display mode is the scenery mode, the imaging unit 32H receives an operation (object selection operation) of selecting a single object to be used as a subject object SO in the scenery mode via the operation unit of the user terminal 20H. In a case where the display mode is the scenery mode, the imaging unit 32H causes the virtual camera 50 to perform imaging of the subject object SO at a plurality of imaging positions. In other words, in the scenery mode, the virtual camera 50 images only the single selected subject object SO at the plurality of imaging positions.

A plurality of imaging positions are determined (calculated) on the basis of a position and a direction of the subject object SO, and a movement pattern. The movement pattern includes information regarding a movement path of the virtual camera 50, and for calculating a plurality of imaging positions on the basis of the position and the direction of the subject object SO. For example, information or the like regarding relative coordinates of a point of gaze set in the subject object SO is included in a time series. An imaging position is calculated in a game space (world coordinate system) by using the relative coordinates. The information regarding the relative coordinates is time series data, and thus the imaging positions are changed according to elapsed time from starting of imaging.

Therefore, a movement path formed by the movement pattern corresponds to a plurality of imaging positions. Information regarding the movement pattern has a general configuration, and thus detailed description thereof will be omitted here. The movement pattern may have any configuration as long as at least a position (imaging position) of the virtual camera 50 can be determined.

Figure 21:
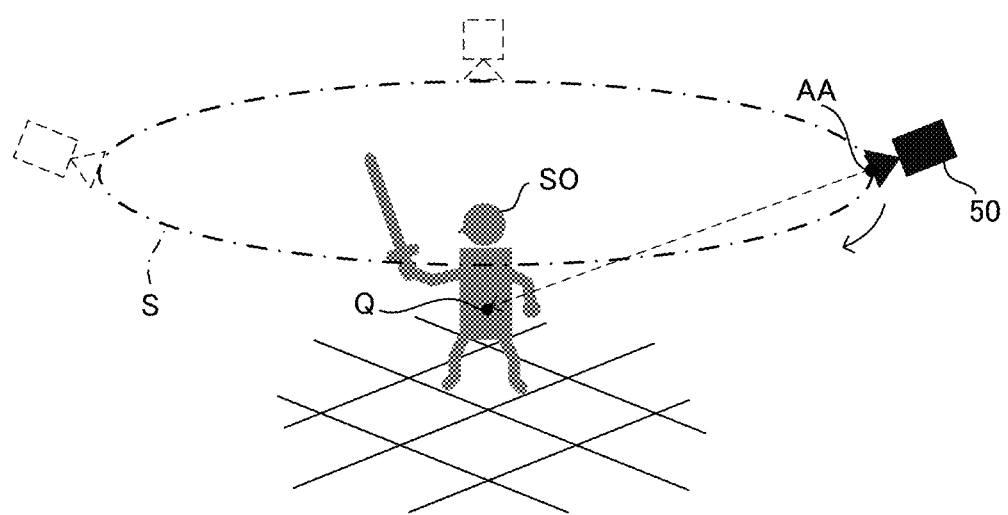
FIG. 21 is a perspective view illustrating a game space generated by a user terminal corresponding to at least one embodiment of the present invention.

In an example illustrated in FIG. 21, the virtual camera 50 is moved and performs imaging on a circumference S (movement path) which is separated from a point of gaze Q set in the subject object SO by a predetermined distance on the basis of the movement pattern. More specifically, the virtual camera 50 starts movement in a clockwise direction from an imaging starting position AA on the rear side of the subject object SO, and is moved on the circumference S so as to be returned to the imaging starting position AA again for one minute. A direction of the virtual camera 50 is determined on the basis of an imaging position and the point of gaze Q. In a case where the time has elapsed, and the virtual camera is returned to the imaging starting position AA, the virtual camera may be repeatedly moved on the circumference S.

The storage unit of the user terminal 20H stores a plurality of movement patterns. The imaging unit 32H randomly selects one movement pattern from the plurality of movement patterns during starting of the scenery mode. A point of gaze is set in advance in each of objects to be used as the subject object SO.

Figure 22:
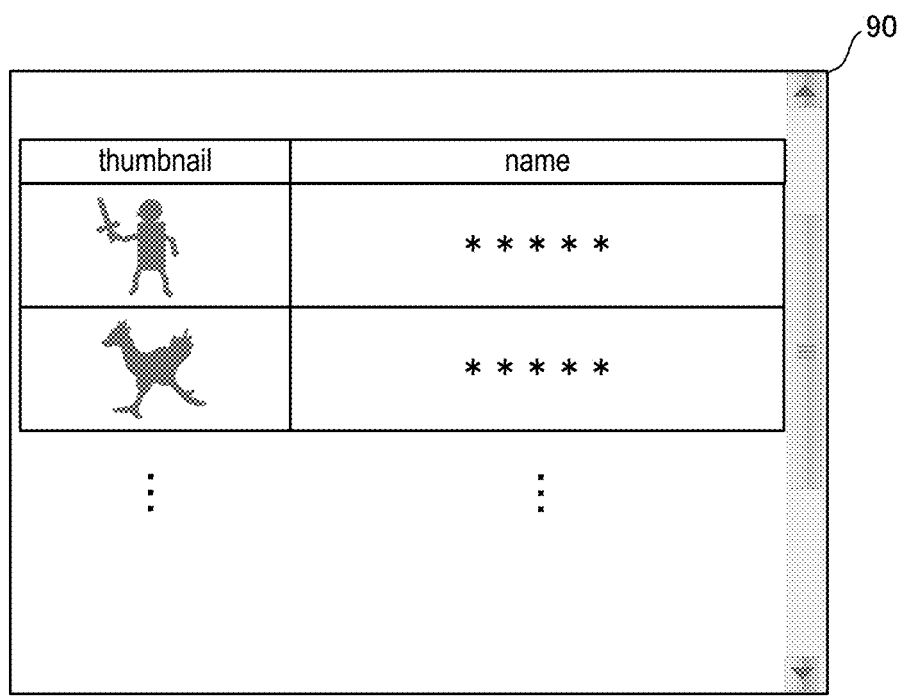
FIG. 22 is a diagram illustrating an example of a selection screen corresponding to at least one embodiment of the present invention.

In the example of the present embodiment, among a plurality of objects (including a player object PO) disposed in the game space, objects located within a predetermined range (predetermined distance D) from the player object PO are used as candidates (selection targets) of the subject object SO. If the user starts an object selection operation, a selection screen 90 as illustrated in FIG. 22 is displayed on the display unit. Information (a thumbnail, the name, and the like) regarding objects as a selection target is displayed on the selection screen 90. The user selects an object which is desired to be used as the subject object SO by operating the operation unit and thus completes the object selection operation, and the selected object is set as the subject object SO. The information regarding the objects displayed on the selection screen 90 may be acquired from information which is stored in the storage unit in correlation with each object. A configuration of the selection screen 90 is not particularly limited thereto, and may be any configuration as long as the user can select the subject object SO.

The display control unit 33H displays a game image captured by the virtual camera 50 on the display unit. In a case where the display mode is the scenery mode, the display control unit 33H sequentially displays game images generated through imaging at the respective imaging positions on the display unit. The virtual camera 50 is moved according to elapse of time on the basis of a movement pattern as shown in the example illustrated in FIG. 21, and thus the subject object SO is displayed at different camera angles.

Next, a description will be made of an operation of the game system 100 (system 100) of this embodiment.

Figure 23:
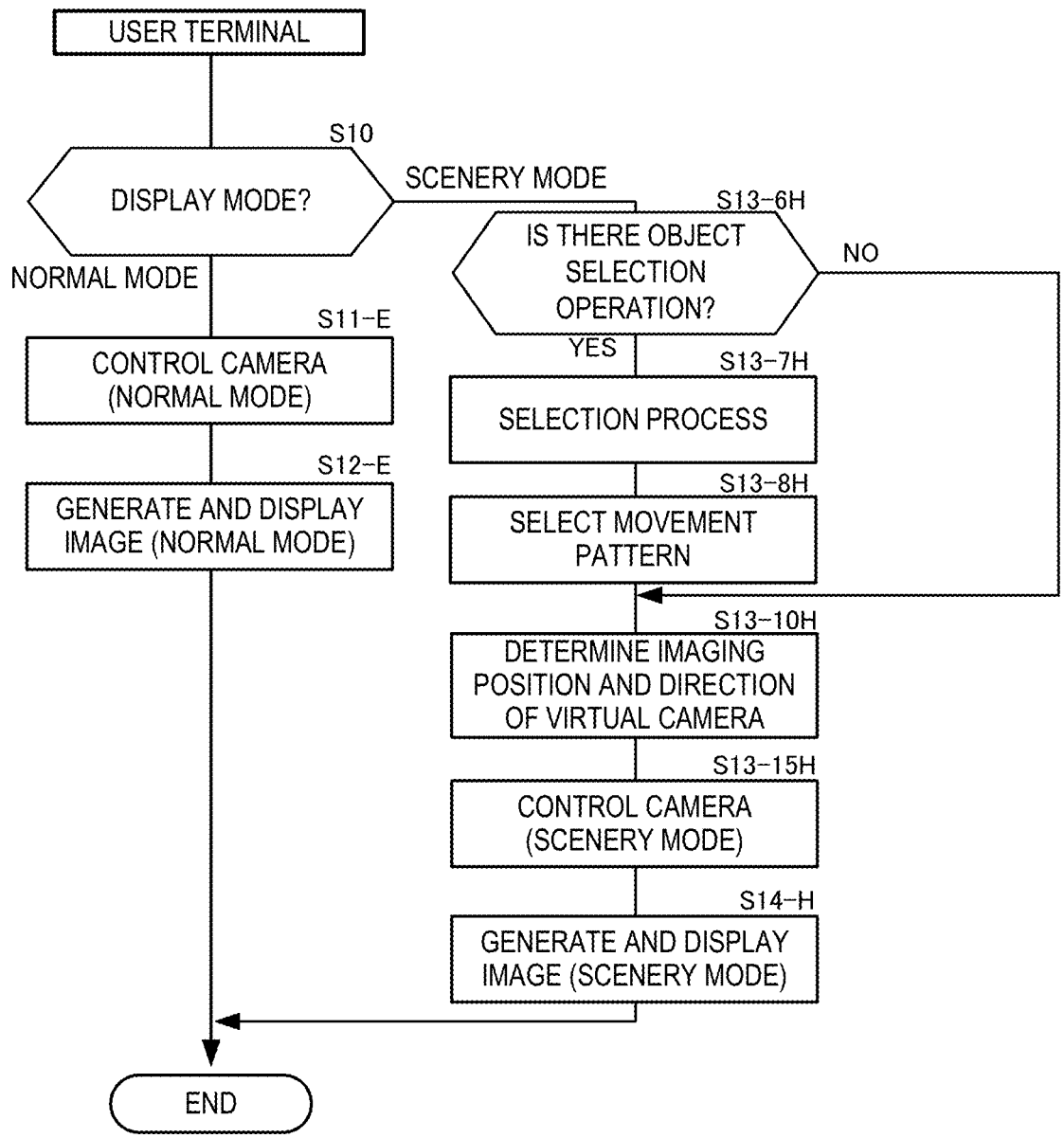
FIG. 23 is a flowchart illustrating an example of an imaging display process corresponding to at least one embodiment of the present invention.

FIG. 23 is a flowchart illustrating an example of an imaging display process performed by the system 100. In the imaging display process of this example, a process of controlling imaging in the virtual camera 50 and display of a game image, corresponding to the above-described display mode, is performed. Hereinafter, as an example, a description will be made of a case where the user terminal 20H performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20H receives information regarding a video game from the video game processing server 10 before performing the imaging display process.

In the imaging display process, the user terminal 20H determines whether the display mode is the normal mode or the scenery mode (step S10). If it is determined that the display mode is the normal mode (step S10: normal mode), the user terminal 20H controls the virtual camera 50 in the normal mode (step S11-E). As described above, a position and a direction of the virtual camera 50 are determined on the basis of a position of the player object PO so that the back of the player object PO and the vicinity of the player object PO are included in a game image, and imaging is performed. Thereafter, the user terminal 20H generates an image (game image) of a game space captured by the virtual camera 50 through the process in step S11-E, and displays the game image on the display unit (step S12-E).

On the other hand, if it is determined that the display mode is the scenery mode through the process in step S10, the user terminal 20H determines whether or not there is the object selection operation (step S13-6H). In a case where there is no object selection operation (step S13-6H: NO), the user terminal 20H proceeds to a process in step S13-10H. In a case where the object selection operation has never been performed, the player object PO which is set as an initial value is used as the subject object SO, and a predetermined movement pattern is selected.

On the other hand, in a case where there is the object selection operation (step S13-6H: YES), the user terminal 20H performs a selection process (step S13-7H). Specifically, the user terminal 20H displays the above-described selection screen 90 so as to cause the user to select an object to be used as the subject object SO, and sets the selected object as the subject object SO. Next, the user terminal 20H selects (sets) a single movement pattern to be used in the scenery display mode from among a plurality of movement patterns stored in the storage unit (step S13-8H).

Thereafter, the user terminal 20H determines a single imaging position (viewpoint position) and a direction of the virtual camera on the basis of elapsed time from starting of the scenery mode, a position and a direction of the set subject object SO, and the set movement pattern (step S13-10H). The user terminal 20H controls the virtual camera 50 in the scenery mode (step S13-15H). For example, imaging is performed by the virtual camera 50 at the imaging position determined through the process in step S13-10H and in the direction of the virtual camera 50 determined through the process in step S13-10H. Thereafter, the user terminal 20H generates an image (game image) captured by the virtual camera 50 through the process in step S13-15H, and displays the game image on the display unit (step S14-H).

As mentioned above, as one aspect of the eighth embodiment, since the user terminal 20H is configured to include the mode setting unit 31E, the imaging unit 32H, and the display control unit 33H, it is possible to display, in a predetermined order, game images which may interest the user on the display unit by executing the scenery mode, for example, even in a situation in which a player object PO is scarcely operated. Since the user can select the subject object SO, only a user's favorite object can be displayed on the display unit as the subject object SO and can be watched. Therefore, it is possible to display a more interesting game image on the display unit.

In the above-described example of the eighth embodiment, only a single object can be selected as the subject object SO, but two or more objects may be selected. In this case, for example, imaging based on a movement pattern is completed in relation to a certain subject object SO, and then the next subject object SO may be displayed.

In a case where the subject object SO of the above-described example of the eighth embodiment is not set, for example, a plurality of objects may be randomly displayed in the same manner as in the fifth embodiment.

In the above-described example of the eighth embodiment, a position (imaging position) and a direction of the virtual camera 50 are determined by using a movement pattern, but the movement pattern may not necessarily be used. For example, an imaging range which is specified on the basis of a position of a subject object may be set, and a position which is randomly selected from the imaging range may be used as an imaging position.

In the above-described example of the eighth embodiment, an object selected by the user is used as the subject object SO, but is not particularly limited thereto. In the same manner as in the fifth embodiment, objects located within the predetermined distance D from the player object PO may be used as the subject objects SO, and imaging may be performed on the basis of a movement pattern when the respective subject objects SO are imaged in order.

In the above-described example of the eighth embodiment, the object selection operation can be received during the scenery mode as the display mode, but there may be a configuration in which the object selection operation can be received during the normal mode.

Ninth Embodiment

Figure 24:
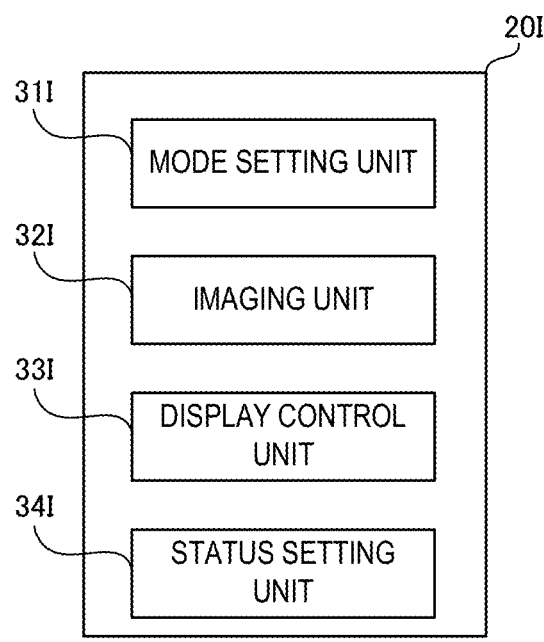
FIG. 24 is a block diagram illustrating a configuration of a user terminal corresponding to at least one embodiment of the present invention.

FIG. 24 is a block diagram illustrating a configuration of a user terminal 20I as an example of the user terminal 20. In this example, the user terminal 20I includes at least a mode setting unit 31I, an imaging unit 32I, a display control unit 33I, and a status setting unit 34I.

The mode setting unit 31I sets a display mode of a game image displayed on the display unit out of at least the normal mode and the scenery mode according to a preset predetermined condition. In an example of the present embodiment, a predetermined condition in a case where the display mode is set (changed) from the normal mode to the scenery mode includes that a status of the player object PO is set to a seat-leaving (away) status. The seat-leaving status indicates a state in which a user does not play a game, such as a state in which a user's intention such as "not playing the game now" is displayed, and a state in which the user does not perform an operation for a predetermined time period. The seat-leaving status is referred to by a plurality of users in order to recognize states of other users. A status of the player object PO is set by the status setting unit 34I.

The status setting unit 34I sets a status of the player object PO according to a state of the user (player object PO). The status setting unit 34I sets a status of the player object PO to the seat-leaving status in a case where the user performs an operation of setting seat-leaving by operating the operation unit of the user terminal 20I, and the user does not operate the operation unit for a predetermined time period. In a case where the user performs an operation of canceling the setting of seat-leaving, the status setting unit 34I changes (sets) a status of the player object PO from the seat-leaving status to another status. Settings of a status are generally configured, and thus detailed description thereof will be omitted.

The imaging unit 32I controls the virtual camera 50. In a case where the display mode is the normal mode, the imaging unit 32I causes the virtual camera 50 which is disposed on the basis of a position of the player object PO, to perform imaging. In the example of the present embodiment, in the same manner as in the fifth embodiment, imaging is performed by the virtual camera 50 disposed at a position (basic position) which is separated from a position of the player object by a predetermined distance obliquely upward on the back face thereof.

The imaging unit 32I disposes respective virtual cameras 50 at a plurality of preset imaging positions. The imaging unit 32I selects a single virtual camera 50 from among the virtual cameras 50 disposed at the respective imaging positions in a predetermined order and causes the selected virtual camera 50 to perform imaging. The predetermined order is set in advance. The imaging unit 32I causes the selected virtual camera 50 to be moved from an imaging position where the virtual camera 50 is disposed to the virtual camera 50 which will be selected next on the basis of a movement pattern, and to perform imaging. The movement pattern includes information regarding a movement path of the virtual camera 50. For example, information regarding position coordinates in a game space (world coordinate system) from a starting position of movement to an ending position thereof is included in a time series. Information regarding the movement pattern has a general configuration, and thus detailed description thereof will be omitted here.

The movement pattern is stored in the storage unit of the user terminal 20I so that a plurality of movement patterns are correlated with a single virtual camera 50. The imaging unit 32I selects a single movement pattern from among a plurality of corresponding movement patterns in relation to the selected virtual camera 50. The movement pattern may have any configuration as long as at least a movement position of the virtual camera 50 can be determined. In the example of the present embodiment, a direction of the virtual camera 50 is fixed to an initial value, but may be changed in such a way of information (for example, information regarding a point of gaze) regarding a direction of the virtual camera 50 being included in a movement pattern.

The imaging unit 32I moves the selected virtual camera 50 to the finish position on the basis of the movement pattern, and then selects (performs changing to) the next virtual camera 50 according to the predetermined order. In the example of the present embodiment, the movement pattern is configured so that the finish position included in the movement pattern of the selected virtual camera 50 becomes an imaging position of the virtual camera 50 which will be selected next.

Figure 25:
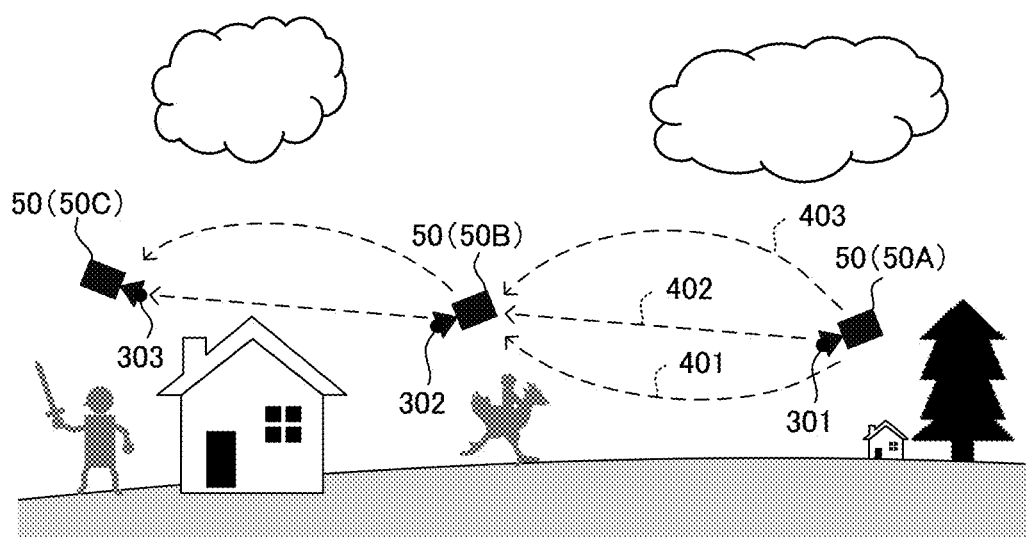
FIG. 25 is a side view illustrating a game space generated by a user terminal corresponding to at least one embodiment of the present invention.

An example illustrated in FIG. 25 shows a state in which the virtual cameras 50 (50A to 50C) are disposed at a plurality of imaging positions 301 to 303 in a game space. In the example illustrated in FIG. 25, the virtual cameras 50A, 50B and 50C are sequentially selected in a predetermined order. Three movement patterns 401 to 403 are set in the virtual camera 50A. FIG. 25 illustrates movement paths of the movement patterns 401 to 403. The imaging unit 32I selects the movement pattern 401 from the corresponding movement patterns 401 to 403 in relation to the selected virtual camera 50A. The virtual camera 50A is moved toward the next selected virtual camera 50B on the basis of the movement pattern 401. In other words, the selected virtual camera 50A is moved from the imaging position 301 (imaging starting position) where the virtual camera 50A is disposed to the imaging position 302 (ending position) where the next selected virtual camera 50B is disposed.

The display control unit 33I displays a game image captured by the virtual camera 50 on the display unit. In a case where the display mode is the scenery mode, the display control unit 33I displays game images generated through imaging in the selected virtual camera 50 on the display unit. The virtual camera 50 is moved on the basis of the movement pattern as in the example illustrated in FIG. 25, and thus game images generated through the imaging in the respective virtual cameras 50 disposed at a plurality of imaging positions are consecutively displayed. In a case where the virtual cameras 50 which are respectively disposed at a plurality of imaging positions are not moved, if the virtual cameras 50 are changed, game images are suddenly changed and are thus displayed in a fragmented manner. However, as in the example of the present embodiment, since the respective virtual cameras 50 are moved on the basis of the movement patterns, even if the virtual cameras 50 are changed, game images are consecutively displayed.

Next, a description will be made of an operation of the game system 100 (system 100) of this embodiment.

Figure 26:
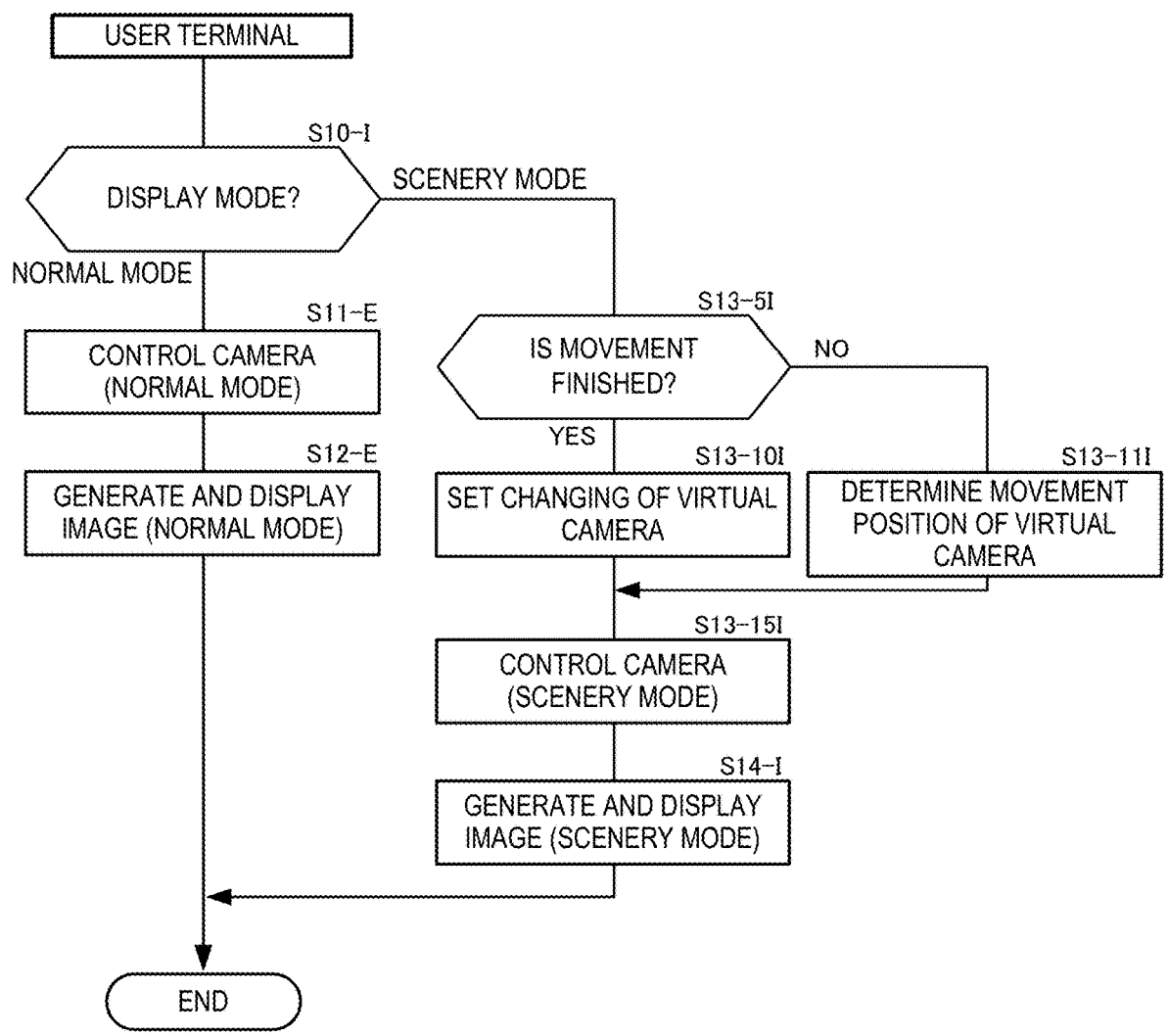
FIG. 26 is a flowchart illustrating an example of an imaging display process corresponding to at least one embodiment of the present invention.

FIG. 26 is a flowchart illustrating an example of an imaging display process performed by the system 100. In the imaging display process of this example, a process of controlling imaging in the virtual camera 50 and display of a game image, corresponding to the above-described display mode, is performed. Hereinafter, as an example, a description will be made of a case where the user terminal 20I performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20I receives information regarding a video game from the video game processing server 10 before performing the imaging display process.

In the imaging display process, the user terminal 20I determines whether the display mode is the normal mode or the scenery mode (step S10-I). In the example of the present embodiment, the user terminal 20I determines whether or not a status of the player object PO is the seat-leaving status. If it is determined that the display mode is the normal mode (step S10-I: normal mode), the user terminal 20I controls the virtual camera 50 in the normal mode (step S11-E). As described above, a position and a direction of the virtual camera 50 are determined on the basis of a position of the player object PO so that the back of the player object PO and the vicinity of the player object PO are included in a game image, and imaging is performed. Thereafter, the user terminal 20I generates an image (game image) of a game space captured by the virtual camera 50 through the process in step S11-E, and displays the game image on the display unit (step S12-E).

On the other hand, if it is determined that the display mode is the scenery mode through the process in step S10-I, the user terminal 20I determines whether or not movement of a selected virtual camera 50 is finished (step S13-5I). In other words, it is determined whether or not the selected virtual camera 50 arrives at an ending position to which the virtual camera 50 is to be moved on the basis of a selected movement pattern. Since the virtual camera 50 and the movement pattern are not selected at the time of starting the scenery mode, the user terminal 20I determines that movement of the selected virtual camera 50 is finished (step S13-5I: YES), and sets changing of the virtual camera 50 (step S13-10I). Specifically, the user terminal 20I selects a new (next) virtual camera 50 according to a predetermined order, and selects a single movement pattern of the next selected virtual camera 50. The next selected virtual camera 50 is disposed at a preset imaging position, and also has a preset direction.

The user terminal 20I controls the virtual camera 50 in the scenery mode (step S13-15I). For example, imaging is performed by the virtual camera 50 at the imaging position determined through the process in step S13-10I (or step S13-11I) and in the direction of the virtual camera 50 determined through the process in step S13-10I (or step S13-11I). Thereafter, the user terminal 20I generates an image (game image) of a game space captured by the virtual camera 50 through the process in step S13-15I, and displays the game image on the display unit (step S14-I).

If it is determined that movement of the selected virtual camera 50 is not finished through the process in step S13-5I, the user terminal 20I updates a movement position of the selected virtual camera 50 on the basis of the selected movement pattern (step S13-11I). A direction of the selected virtual camera 50 is not changed. Next, the user terminal 20I performs the processes in steps S13-15I and S14-I.

As mentioned above, as one aspect of the ninth embodiment, since the user terminal 20I is configured to include the mode setting unit 31I, the imaging unit 32I, the display control unit 33I, and the status setting unit 34I, it is possible to display, in a predetermined order, game images which may interest the user on the display unit by executing the scenery mode, for example, even in a situation in which a player object is scarcely operated. The virtual camera 50 is moved on the basis of a movement pattern, and thus it is possible to consecutively display game images generated through imaging performed by the virtual cameras 50 which are respectively disposed at a plurality of imaging positions.

In the above-described example of the ninth embodiment, the virtual cameras 50 are changed in a predetermined order which is set in advance, but changing thereof is not particularly limited thereto. The virtual cameras 50 may be selected at random.

Tenth Embodiment

Figure 27:
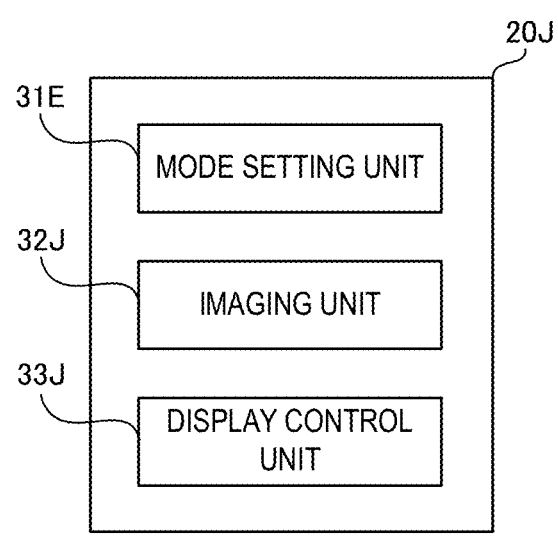
FIG. 27 is a block diagram illustrating a configuration of a user terminal corresponding to at least one embodiment of the present invention.

FIG. 27 is a block diagram illustrating a configuration of a user terminal 20J as an example of the user terminal 20. In this example, the user terminal 20J includes at least a mode setting unit 31E, an imaging unit 32J, and a display control unit 33J.

As described in the fifth embodiment, the mode setting unit 31E sets a display mode of a game image displayed on the display unit out of at least the normal mode and the scenery mode according to a preset predetermined condition.

The imaging unit 32J controls the virtual camera 50. In a case where the display mode is the normal mode, the imaging unit 32J causes the virtual camera 50 which is disposed on the basis of a position of the player object PO, to perform imaging. In the example of the present embodiment, in the same manner as in the fifth embodiment, imaging is performed by a virtual camera disposed at a position (basic position) which is separated from a position of the player object by a predetermined distance obliquely upward on the back face thereof.

In a case where the display mode is the scenery mode, the imaging unit 32J causes the virtual cameras 50 to perform imaging at a plurality of imaging positions in a game space. In the example of the present embodiment, in a case where a display mode is the scenery mode, a single imaging position is randomly selected from a plurality of imaging positions, and the virtual camera 50 performs imaging at the selected imaging position. In the example of the present embodiment, imaging time at a single imaging position is set to a predetermined time period (for example, for 10 seconds). In other words, imaging positions are changed every ten seconds. The imaging unit 32J determines (calculates) a plurality of points of gaze on the basis of positions of a plurality of objects disposed in the game space, and determines (calculates) a plurality of imaging positions on the basis of the plurality of points of gaze. In the example of the present embodiment, a single imaging position is determined for a single point of gaze.

Regarding the determination of a point of gaze, it is determined whether or not a plurality of line segments (RAY) extending from a position of the player object PO in the game space at a predetermined interval (equal interval) collide with a plurality of objects which are present in the game space, and a collision position is determined as a point of gaze in a case where collision occurs. More specifically, a collision position between the line segment and a polygon forming the object is set as a point of gaze. Therefore, any one of positions of objects other than the player object PO is set as a point of gaze. A position of the player object PO as a starting point of the line segment may be any position as long as the position is related to the player object PO, and the central position of the player object PO may be used as a starting point of the line segment.

The determined point of gaze is stored in the storage unit of the user terminal 20J. Stored information regarding the point of gaze includes, for example, identification information regarding an object in which the point of gaze is set, and position coordinates of the point of gaze in a model coordinate system (a local coordinate system) of the object.

Figure 28:
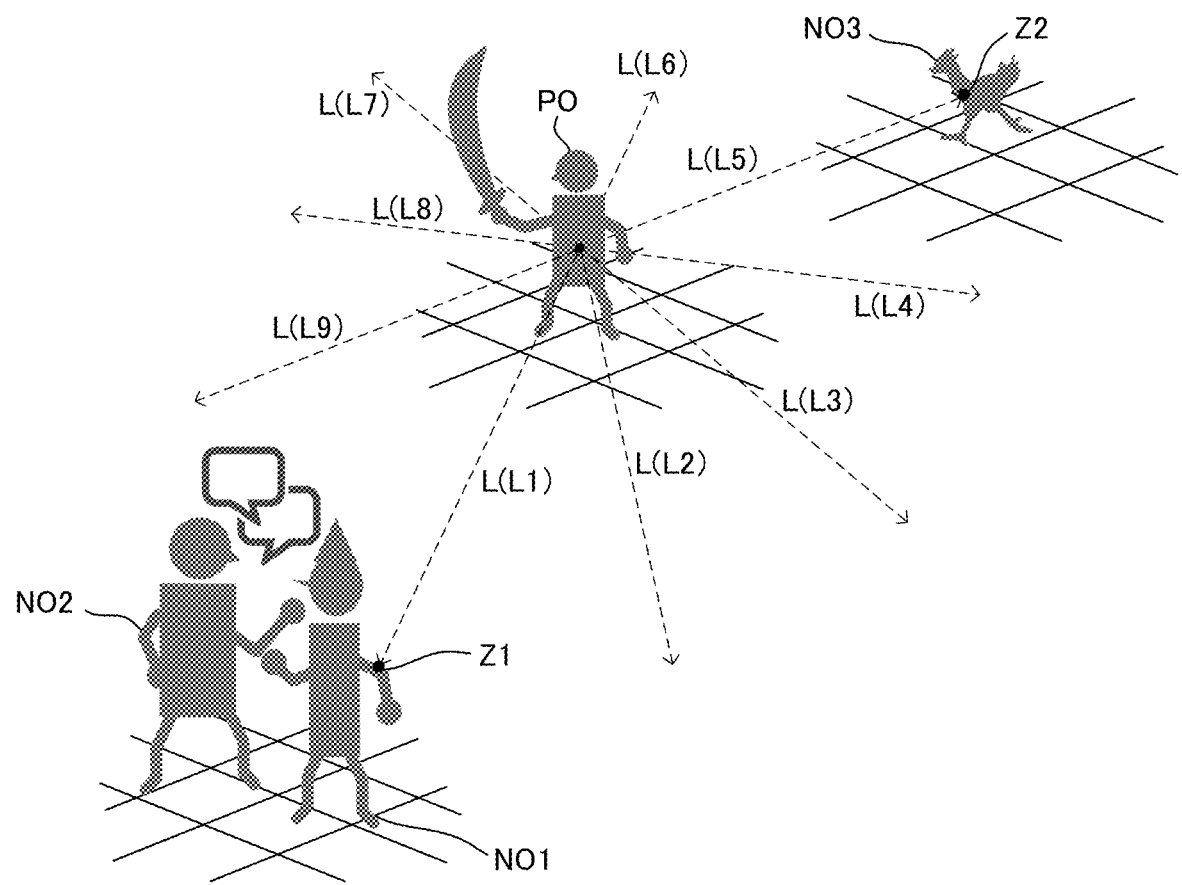
FIG. 28 is a perspective view illustrating a game space generated by a user terminal corresponding to at least one embodiment of the present invention.

In an example illustrated in FIG. 28, the player object PO, and three objects NO1, NO2 and NO3 are present in a game space. Among a plurality of line segments L (L1 to L9) extending from a position of the player object PO at a predetermined interval, the line segment L1 collides with the upper arm of the object NO1, and the line segment L5 collides with the chest of the object NO3. Therefore, collision positions Z1 and Z2 between the objects NO1 and NO3, and the line segments L1 and L5 are set as points of gaze.

As described above, calculation of a collision position between a line segment and an object is performed by using a general configuration such as RAY PICK, and thus detailed description thereof will be omitted.

An imaging position corresponding to the set point of gaze may be determined on the basis of, for example, a position of the point of gaze and a position of the colliding object. In this case, a position of the virtual camera 50 (an imaging position) may be determined so that at least some of the colliding objects are included in a game image. For example, an imaging position of the virtual camera 50 is determined so as to be located on a line segment which includes the central position of the colliding object and the point of gaze. Each imaging position is stored in the storage unit of the user terminal 20J in correlation with the point of gaze. Stored information regarding the imaging position includes, for example, position coordinates relative to the point of gaze. Therefore, it is possible to calculate an imaging position and a direction of the virtual camera 50 in the game space (world coordinate system) on the basis of the point of gaze and the information regarding the imaging position corresponding to the point of gaze, stored in the storage unit.

The display control unit 33J displays a game image captured by the virtual camera 50 on the display unit. In a case where the display mode is the normal mode, as described above, the game image including a state of the back face side of the player object PO and the vicinity of the player object PO is displayed.

In a case where the display mode is the scenery mode, the display control unit 33J sequentially displays game images generated through imaging at the respective imaging positions on the display unit. In other words, displayed objects are changed whenever ten seconds elapse so that imaging positions are changed. Therefore, the user can enjoy watching states of various objects of the game space in which the player object PO is present.

Next, a description will be made of an operation of the game system 100 (system 100) of this embodiment.

Figure 29:
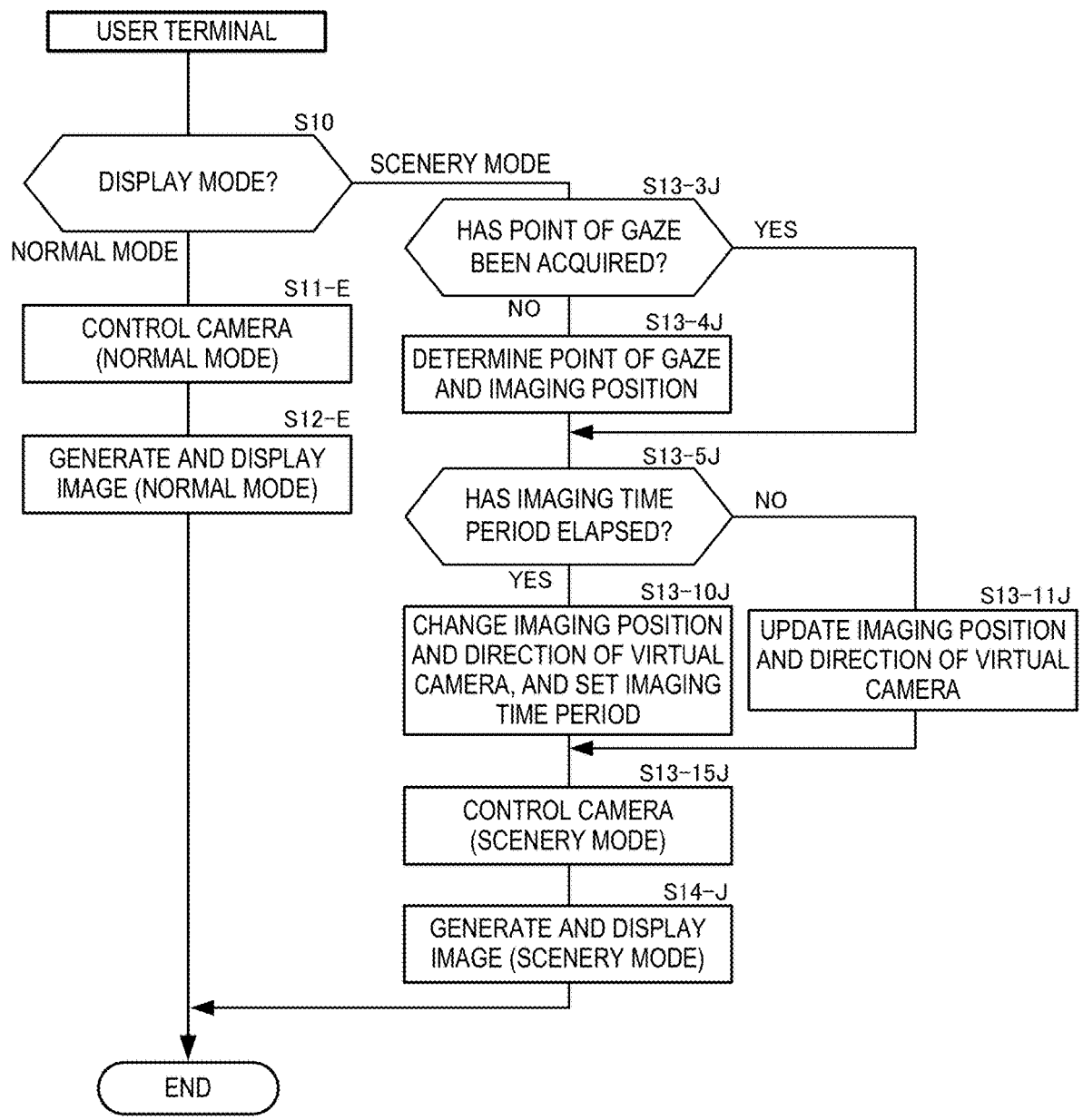
FIG. 29 is a flowchart illustrating an example of an imaging display process corresponding to at least one embodiment of the present invention.

FIG. 29 is a flowchart illustrating an example of an imaging display process performed by the system 100. In the imaging display process of this example, a process of controlling imaging in the virtual camera 50 and display of a game image, corresponding to the above-described display mode, is performed. Hereinafter, as an example, a description will be made of a case where the user terminal 20J performs the imaging display process. A flowchart illustrating an operation of the video game processing server 10 will not be described from the viewpoint of avoiding repeated description.

The imaging display process of this example is repeatedly performed in the unit of one frame (for example, 1/60 seconds) from starting of display of a game space and ending thereof. The user terminal 20J receives information regarding a video game from the video game processing server 10 before performing the imaging display process.

In the imaging display process, the user terminal 20J determines whether the display mode is the normal mode or the scenery mode (step S10). If it is determined that a display mode is the normal mode (step S10: normal mode), the user terminal 20J controls the virtual camera 50 in the normal mode (step S11-E). As described above, a position and a direction of the virtual camera 50 are determined on the basis of a position of the player object PO so that the back of the player object PO and the vicinity of the player object PO are included in a game image, and imaging is performed. Thereafter, the user terminal 20J generates an image (game image) of a game space captured by the virtual camera 50 through the process in step S11-E, and displays the game image on the display unit (step S12-E).

On the other hand, if it is determined that the display mode is the scenery mode through the process in step S10, the user terminal 20J determines whether or not points of gaze is determined (step S13-3J). For example, if information regarding points of gaze is not stored in the storage unit, it may be determined that points of gaze is not determined. If it is determined that points of gaze is determined (step S13-3J: YES), the user terminal 20J proceeds to a process in step S13-5J. If it is determined that points of gaze is not determined (step S13-3J: NO), the user terminal 20J performs the above-described determination of points of gaze and determination of a plurality of imaging positions (step S13-4J).

Next, the user terminal 20J determines whether or not an imaging time period has elapsed (step S13-5J). If it is determined that the imaging time period has elapsed (step S13-5J: YES), the user terminal 20J determines a single imaging position among a plurality of imaging positions and a direction of the virtual camera 50, and sets a new imaging time period (step S13-10J). In other words, the imaging time period has elapsed, and thus the next imaging position is determined. In the example of the present embodiment, a single imaging position is randomly selected from a plurality of imaging positions, and a point of gaze corresponding to the selected imaging position is selected. Consequently, a point of gaze, an imaging position, and a direction of the virtual camera 50 are determined on the basis of a position of an object corresponding to the point of gaze. Regarding setting of an imaging time period, for example, a current time point indicating starting of imaging is set.

Next, the user terminal 20J controls the virtual camera 50 in the scenery mode (step S13-15J). For example, imaging is performed by the virtual camera 50 at the imaging position determined through the process in step S13-10J (or step S13-11J) and in the direction of the virtual camera 50 determined through the process in step S13-10J (or step S13-11J). Thereafter, the user terminal 20J generates an image (game image) of a game space captured by the virtual camera 50 through the process in step S13-15J, and displays the game image on the display unit (step S14-J).

If it is determined that the imaging time period has not elapsed through the process in step S13-5J, the user terminal 20J updates the currently selected imaging position and direction of the virtual camera 50 (step S13-11J). In other words, an imaging position and a point of gaze in the game space (world coordinate system) are updated according to a change of an object corresponding to the currently selected point of gaze and imaging position. Next, the user terminal 20J performs the processes in steps S13-15J and S14-J.

The processes in the scenery mode are repeatedly performed in the above-described manner, and thus objects in which the points of gaze are set at the respective imaging positions are displayed in order whenever an imaging time period elapses so that imaging positions are changed as described above.

As mentioned above, as one aspect of the tenth embodiment, since the user terminal 20J is configured to include the mode setting unit 31E, the imaging unit 32J, and the display control unit 33J, it is possible to display, in a predetermined order, various objects (game images) which may interest the user on the display unit by executing the scenery mode, for example, even in a situation in which the player object PO is scarcely operated.

In the above-described example of the tenth embodiment, determination of a point of gaze and an imaging position is performed only once, but is not particularly limited thereto, and determination execution timing may be any timing.

An object in the above-described example of each embodiment may employ not only a human object and a monster object but also objects of furniture such as a chair, wall-mounted furniture, and the like. A camera angle in the scenery mode in the above-described example of each embodiment is not limited to the configuration described in the example of each embodiment.

APPENDIXES

The above embodiments have been described so that a person skilled in the art can implement at least the following inventions.

[1]

A game program causing a computer to realize a function of controlling progress of a game by imaging, with a virtual camera, a three-dimensional game space in which a plurality of objects including a player object controlled by a user are disposed and displaying the game space on a display unit as a game image, the program causing the computer to execute:

a mode setting function of setting a display mode of a game image displayed on the display unit out of at least a normal mode and a scenery mode according to a predetermined condition;

an imaging function of causing the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display control function of displaying a game image captured by the virtual camera on the display unit, and displaying game images captured at the plurality of imaging positions in a predetermined display embodiment in a case where the display mode is the scenery mode.

[2]

The game program according to [1], in which the imaging function realizes a function of determining the plurality of imaging positions on the basis of positions of at least some of the plurality of objects.

[3]

The game program according to [2], in which the imaging function realizes a function of setting at least some of the plurality of objects as subject objects imaged by the virtual camera, and determining the plurality of imaging positions on the basis of positions of the subject objects, and a function of determining directions of the virtual camera at the plurality of imaging positions on the basis of the positions of the subject objects.

[4]

The game program according to any one of [1] to [3], in which the display control function realizes a function of displaying game images captured at the plurality of imaging positions on the display unit in a predetermined order as the predetermined display embodiment.

[5]

The game program according to [4], in which the display control function realizes a function of displaying a game image captured at a certain imaging position on the display unit for a predetermined time period, and then displaying a game image captured at the next imaging position according to the predetermined order on the display unit.

[6]

The game program according to [4] or [5], in which the imaging function realizes a function of moving the virtual camera to the plurality of imaging positions in the predetermined order and causing the virtual camera to perform imaging, and in which the display control function realizes a function of displaying game images on the display unit in an imaging order.

[7]

The game program according to [4], in which the imaging function realizes a function of disposing a plurality of the virtual cameras at the plurality of preset imaging positions, respectively, and causing one of the virtual cameras selected in the predetermined order to perform imaging while moving toward a position where another one of the virtual cameras to be selected next is disposed, and a function of selecting a single movement pattern corresponding to the one selected virtual camera from among a plurality of movement patterns, and in which the display control function realizes a function of displaying a game image captured by the one selected virtual camera on the display unit.

[8]

The game program according to any one of [4] to [7], in which the imaging function realizes a function of randomly determining the predetermined order from among the plurality of imaging positions.

[9]

The game program according to any one of [4] to [8], in which the display control function realizes a function of continuously displaying a game image obtained at the present imaging position on the display unit on the basis of an operation of stopping transition in the predetermined order on an operation unit operated by the user, in a case where game images captured at the plurality of imaging positions are displayed on the display unit in the predetermined order.

[10]

The game program according to any one of [4] to [9], in which the display control function realizes a function of starting to display a game image obtained at the next imaging position from the present imaging position on the display unit according to the predetermined order on the basis of an operation of executing transition in the predetermined order on an operation unit operated by the user, in a case where game images captured at the plurality of imaging positions are displayed on the display unit in the predetermined order.

[11]

The game program according to [2] or [3], in which at least some of the plurality of objects are located within a range of a predetermined distance from the player object.

[12]

The game program according to [3], in which the imaging function realizes a function of setting a single object which is selected from among the plurality of objects on the basis of an object selection operation on an operation unit operated by the user, as a subject object captured by the virtual camera, and determining the plurality of imaging positions on the basis of a position of the subject object, and a function of determining directions of the virtual camera at the plurality of imaging positions.

[13]

The game program according to [2], in which the imaging function realizes a function of selecting a single movement pattern from among a plurality of preset movement patterns, a function of selecting a single object from among at least some of the plurality of objects in a predetermined order, and setting the single selected object as a subject object captured by the virtual camera, and a function of causing the virtual camera to perform imaging of the subject object while moving the virtual camera on the basis of a position of the subject object and the single selected movement pattern, and in which the display control function realizes a function of displaying a game image captured by the virtual camera on the display unit.

[14]

The game program according to any one of [1] to [13], in which the predetermined condition for setting the display mode to the scenery mode includes a case where the user has input an operation of executing the scenery mode.

[15]

The game program according to any one of [1] to [13], causing the computer to further execute:

a status setting function of setting a status of the player object to a seat-leaving status in which the user does not play a game on the basis of the presence or absence of an operation on an operation unit operated by the user, in which the predetermined condition for setting the display mode to the scenery mode includes a case where a status of the player object has been the seat-leaving status.

[16]

The game program according to any one of [1] to [15], in which the predetermined condition for setting the display mode to the normal mode includes a case where the player object has been passively moved during the scenery mode as the display mode.

[17]

The game program according to any one of [1] to [15], in which the predetermined condition for setting the display mode to the normal mode includes a case where a status of the player object has been a predetermined status during the scenery mode as the display mode.

[18]

The game program according to any one of [1] to [17], in which the imaging function realizes a function of determining a plurality of points of gaze on the basis of positions of the plurality of objects disposed in the game space, and determining the plurality of imaging positions on the basis of each of the plurality of points of gaze.

[19]

The game program according to [18], in which the imaging function realizes a function of determining whether or not a line segment extending from a position of the player object in a predetermined direction collides with any one of the plurality of objects in the game space, and causing a collision position to be included in the plurality of points of gaze in a case where collision occurs.

[20]

A server apparatus installed with the game program according to any one of [1] to [19].

[21]

A terminal program causing a game user terminal to realize a function of displaying a game image on a display screen of a display unit and controlling progress of a game, the program causing the game user terminal to execute:

a function of connecting the game user terminal to the server apparatus according to [20] via a communication network.

[22]

A game program causing a server apparatus to control progress of a game, the server apparatus being connected to a game user terminal via a communication network, the game user terminal executing the game by imaging, with a virtual camera, a three-dimensional game space in which a plurality of objects including a player object controlled by a user are disposed and displaying the game space on a display unit as a game image, the program causing the server apparatus to execute:

a mode setting function of setting a display mode of a game image displayed on the display unit out of at least a normal mode and a scenery mode according to a predetermined condition;

an imaging function of causing the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display control function of displaying a game image captured by the virtual camera on the display unit, and displaying game images captured at the plurality of imaging positions in a predetermined display embodiment in a case where the display mode is the scenery mode.

[23]

The game program according to [22], in which the imaging function realizes a function of determining the plurality of imaging positions on the basis of positions of at least some of the plurality of objects.

[24]

The game program according to [23], in which the imaging function realizes a function of setting at least some of the plurality of objects as subject objects imaged by the virtual camera, and determining the plurality of imaging positions on the basis of positions of the subject objects, and a function of determining directions of the virtual camera at the plurality of imaging positions on the basis of the positions of the subject objects.

[25]

The game program according to any one of [22] to [24], in which the display control function realizes a function of displaying game images captured at the plurality of imaging positions on the display unit in a predetermined order as the predetermined display embodiment.

[26]

The game program according to [25], in which the display control function realizes a function of displaying a game image captured at a certain imaging position on the display unit for a predetermined time period, and then displaying a game image captured at the next imaging position according to the predetermined order on the display unit.

[27]

The game program according to [25] or [26], in which the imaging function realizes a function of moving the virtual camera to the plurality of imaging positions in the predetermined order and causing the virtual camera to perform imaging, and in which the display control function realizes a function of displaying game images on the display unit in an imaging order.

[28]

The game program according to [25], in which the imaging function realizes a function of disposing a plurality of the virtual cameras at the plurality of preset imaging positions, respectively, and causing one of the virtual cameras selected in the predetermined order to perform imaging while moving toward a position where another one of the virtual cameras to be selected next is disposed, and a function of selecting a single movement pattern corresponding to the one selected virtual camera from among a plurality of movement patterns, and in which the display control function realizes a function of displaying a game image captured by the one selected virtual camera on the display unit.

[29]

The game program according to any one of [25] to [28], in which the imaging function realizes a function of randomly determining the predetermined order from among the plurality of imaging positions.

[30]

The game program according to any one of [25] to [29], in which the display control function realizes a function of continuously displaying a game image obtained at the present imaging position on the display unit on the basis of an operation of stopping transition in the predetermined order on an operation unit operated by the user, in a case where game images captured at the plurality of imaging positions are displayed on the display unit in the predetermined order.

[31]

The game program according to any one of [25] to [29], in which the display control function realizes a function of starting to display a game image obtained at the next imaging position from the present imaging position on the display unit according to the predetermined order on the basis of an operation of executing transition in the predetermined order on an operation unit operated by the user, in a case where game images captured at the plurality of imaging positions are displayed on the display unit in the predetermined order.

[32]

The game program according to [23] or [24], in which at least some of the plurality of objects are located within a range of a predetermined distance from the player object.

[33]

The game program according to [24], in which the imaging function realizes a function of setting a single object which is selected from among the plurality of objects on the basis of an object selection operation on an operation unit operated by the user, as a subject object captured by the virtual camera, and determining the plurality of imaging positions on the basis of a position of the subject object, and a function of determining directions of the virtual camera at the plurality of imaging positions.

[34]

The game program according to [23], in which the imaging function realizes a function of selecting a single movement pattern from among a plurality of preset movement patterns, a function of selecting a single object from among at least some of the plurality of objects in a predetermined order, and setting the single selected object as a subject object captured by the virtual camera, and a function of causing the virtual camera to perform imaging while moving the virtual camera on the basis of a position of the subject object and the single selected movement pattern, and in which the display control function realizes a function of displaying a game image captured by the virtual camera on the display unit.

[35]

The game program according to any one of [22] to [34], in which the predetermined condition for setting the display mode to the scenery mode includes a case where the user has input an operation of executing the scenery mode.

[36]

The game program according to any one of [22] to [34], causing the server apparatus to further execute:

a status setting function of setting a status of the player object to a seat-leaving status in which the user does not play a game on the basis of the presence or absence of an operation on an operation unit operated by the user, in which the predetermined condition for setting the display mode to the scenery mode includes a case where a status of the player object has been the seat-leaving status.

[37]

The game program according to any one of [22] to [36], in which the predetermined condition for setting the display mode to the normal mode includes a case where the player object has been passively moved during the scenery mode as the display mode.

[38]

The game program according to any one of [22] to [37], in which the predetermined condition for setting the display mode to the normal mode includes a case where a status of the player object has been a predetermined status during the scenery mode as the display mode.

[39]

The game program according to any one of [22] to [38], in which the imaging function realizes a function of determining a plurality of points of gaze on the basis of positions of the plurality of objects disposed in the game space, and determining the plurality of imaging positions on the basis of each of the plurality of points of gaze.

[40]

The game program according to [39], in which the imaging function realizes a function of determining whether or not a line segment extending from a position of the player object in a predetermined direction collides with any one of the plurality of objects in the game space, and causing a collision position to be included in the plurality of points of gaze in a case where collision occurs.

[41]

A game system including a server apparatus connected to a game user terminal via a communication network, the game user terminal executing a game by imaging, with a virtual camera, a three-dimensional game space in which a plurality of objects including a player object controlled by a user are disposed and displaying the game space on a display unit as a game image, the system including:

a mode setter configured to set a display mode of a game image displayed on the display unit out of at least a normal mode and a scenery mode according to a predetermined condition;

an imager configured to cause the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display controller configured to display a game image captured by the virtual camera on the display unit, and displaying game images captured at the plurality of imaging positions in a predetermined display embodiment in a case where the display mode is the scenery mode.

[42]

The game system according to [41], in which the imager determines the plurality of imaging positions on the basis of positions of at least some of the plurality of objects.

[43]

The game system according to [42], in which the imager sets at least some of the plurality of objects as subject objects imaged by the virtual camera, and determines the plurality of imaging positions on the basis of positions of the subject objects, and determines directions of the virtual camera at the plurality of imaging positions on the basis of the positions of the subject objects.

[44]

The game system according to any one of [41] to [43], in which the display controller displays game images captured at the plurality of imaging positions on the display unit in a predetermined order as the predetermined display embodiment.

[45]

The game system according to [44], in which the display controller displays a game image captured at a certain imaging position on the display unit for a predetermined time period, and then displaying a game image captured at the next imaging position according to the predetermined order on the display unit.

[46]

The game system according to [43] or [44], in which the imager moves the virtual camera to the plurality of imaging positions in the predetermined order and causes the virtual camera to perform imaging, and in which the display controller displays game images on the display unit in an imaging order.

[47]

The game system according to [44], in which the imager disposes a plurality of the virtual cameras at the plurality of preset imaging positions, respectively, and causes one of the virtual cameras selected in the predetermined order to perform imaging while moving toward a position where another one of the virtual cameras to be selected next is disposed, and selects a single movement pattern corresponding to the one selected virtual camera from among a plurality of movement patterns, and in which the display controller displays a game image captured by the one selected virtual camera on the display unit.

[48]

The game system according to any one of [44] to [47], in which the imager randomly determines the predetermined order from among the plurality of imaging positions.

[49]

The game system according to any one of [44] to [47], in which the display controller continuously displays a game image obtained at the present imaging position on the display unit on the basis of an operation of stopping transition in the predetermined order on an operation unit operated by the user, in a case where game images captured at the plurality of imaging positions are displayed on the display unit in the predetermined order.

[50]

The game system according to any one of [44] to [48], in which the display controller starts to display a game image obtained at the next imaging position from the present imaging position on the display unit according to the predetermined order on the basis of an operation of executing transition in the predetermined order on an operation unit operated by the user, in a case where game images captured at the plurality of imaging positions are displayed on the display unit in the predetermined order.

[51]

The game system according to [42] or [43], in which at least some of the plurality of objects are located within a range of a predetermined distance from the player object.

[52]

The game system according to [43], in which the imager sets a single object which is selected from among the plurality of objects on the basis of an object selection operation on an operation unit operated by the user, as a subject object captured by the virtual camera, and determines the plurality of imaging positions on the basis of a position of the subject object, and determines directions of the virtual camera at the plurality of imaging positions.

[53]

The game system according to [42], in which the imager selects a single movement pattern from among a plurality of preset movement patterns, selects a single object from among at least some of the plurality of objects in a predetermined order, and sets the single selected object as a subject object captured by the virtual camera, and causes the virtual camera to perform imaging while moving the virtual camera on the basis of a position of the subject object and the single selected movement pattern, and in which the display controller displays a game image captured by the virtual camera on the display unit.

[54]

The game system according to any one of [41] to [53], in which the predetermined condition for setting the display mode to the scenery mode includes a case where the user has input an operation of executing the scenery mode.

[55]

The game system according to any one of [41] to [54], further including:

a status setter configured to set a status of the player object to a seat-leaving status in which the user does not play a game on the basis of the presence or absence of an operation on an operation unit operated by the user, in which the predetermined condition for setting the display mode to the scenery mode includes a case where a status of the player object has been the seat-leaving status.

[56]

The game system according to any one of [41] to [55], in which the predetermined condition for setting the display mode to the normal mode includes a case where the player object has been passively moved during the scenery mode as the display mode.

[57]

The game system according to any one of [41] to [55], in which the predetermined condition for setting the display mode to the normal mode includes a case where a status of the player object has been a predetermined status during the scenery mode as the display mode.

[58]

A game user terminal which controls progress of a game by imaging, with a virtual camera, a three-dimensional game space in which a plurality of objects including a player object controlled by a user are disposed and displaying the game space on a display unit as a game image, the terminal including:

a mode setter configured to set a display mode of a game image displayed on the display unit out of at least a normal mode and a scenery mode according to a predetermined condition;

an imager configured to cause the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display controller configured to display a game image captured by the virtual camera on the display unit, and displaying game images captured at the plurality of imaging positions in a predetermined display embodiment in a case where the display mode is the scenery mode.

[59]

A game progress control method of causing a computer to control progress of a game by imaging, with a virtual camera, a three-dimensional game space in which a plurality of objects including a player object controlled by a user are disposed and displaying the game space on a display unit as a game image, the method including:

a mode setting process of setting a display mode of a game image displayed on the display unit out of at least a normal mode and a scenery mode according to a predetermined condition;

an imaging process of causing the virtual camera which is disposed on the basis of a position of the player object, to perform imaging in a case where the display mode is the normal mode, and causing the virtual camera to perform imaging at a plurality of imaging positions in the game space in a case where the display mode is the scenery mode; and a display control process of displaying a game image captured by the virtual camera on the display unit, and displaying game images captured at the plurality of imaging positions in a predetermined display embodiment in a case where the display mode is the scenery mode.

According to one embodiment of the present invention, the present invention is useful to provide a function of displaying a game image interesting a user.

What is claimed is:

1. A non-transitory computer-readable medium including a game program for causing a computer to realize a function of controlling progress of a game by imaging, with a virtual camera, a three-dimensional game space in which a plurality of objects including a player object controlled by a user are disposed, and displaying the game space on a display as a game image, the game program causing the computer to execute:

setting a status of the player object to a seat-leaving status in which the user does not play a game based on a presence or an absence of an operation by the user;

setting a display mode of a game image displayed on the display out of at least a normal mode and a scenery mode according to a predetermined condition, the predetermined condition for setting the display mode to the scenery mode including a case where the status of the player object is the seat-leaving status;

causing the virtual camera which is disposed based on a position of the player object, to perform first imaging in a case where the display mode is the normal mode, and causing the virtual camera to perform second imaging at a plurality of imaging positions in the game space in a case where the display mode is the scenery mode; and displaying a game image captured by the virtual camera on the display in the case where the display mode is the normal mode, and displaying game images captured at the plurality of imaging positions in a predetermined display embodiment in the case where the display mode is the scenery mode, wherein the game images captured at the plurality of imaging positions are displayed on the display in a predetermined order as the predetermined display embodiment, and a first game image captured at a certain imaging position is displayed on the display for a predetermined time period, and then a second game image captured at a next imaging position is displayed according to the predetermined order on the display.

2. The non-transitory computer-readable medium according to claim 1, wherein, in the second imaging, the plurality of imaging positions is determined based on positions of at least some of the plurality of objects.

3. The non-transitory computer-readable medium according to claim 2, wherein the second imaging includes:

setting at least some of the plurality of objects as subject objects imaged by the virtual camera, and determining the plurality of imaging positions based on positions of the subject objects, and determining directions of the virtual camera at the plurality of imaging positions based on the positions of the subject objects.

4. The non-transitory computer-readable medium according to claim 1, wherein, in the second imaging, the virtual camera moves to the plurality of imaging positions in the predetermined order, and the game images are displayed on the display in an imaging order, the imaging order being the predetermined order.

5. The non-transitory computer-readable medium according to claim 1, wherein the second imaging includes:

disposing a plurality of the virtual cameras at the plurality of preset imaging positions, respectively, and causing one of the plurality of the virtual cameras selected in the predetermined order to perform imaging while moving toward a position where another one of the plurality of the virtual cameras to be selected next is disposed; and selecting a single movement pattern corresponding to the selected one of the plurality of the virtual cameras from among a plurality of movement patterns, and the game image captured by the selected one of the plurality of the virtual cameras is displayed on the display.

6. The non-transitory computer-readable medium according to claim 1, wherein, in the second imaging, the predetermined order is randomly selected from among a plurality of predetermined orders.

7. The non-transitory computer-readable medium according to claim 1, wherein, in the displaying, a game image obtained at a present imaging position is continuously displayed on the display based on an operation of stopping transition in the predetermined order by the user, in a case where the game images captured at the plurality of imaging positions are displayed on the display in the predetermined order.

8. The non-transitory computer-readable medium according to claim 1, wherein, in the displaying, a game image obtained at a next imaging position from a present imaging position is started to be displayed on the display according to the predetermined order based on an operation of executing transition in the predetermined order by the user, in a case where the game images captured at the plurality of imaging positions are displayed on the display in the predetermined order.

9. The non-transitory computer-readable medium according to claim 2, wherein at least some of the plurality of objects are located within a range of a predetermined distance from the player object.

10. The non-transitory computer-readable medium according to claim 1, wherein the second imaging includes:

setting a single object which is selected from among the plurality of objects based on an object selection operation performed by the user, as a subject object captured by the virtual camera, and determining the plurality of imaging positions based on a position of the subject object; and determining directions of the virtual camera at the plurality of imaging positions based on the position of the subject object.

11. The non-transitory computer-readable medium according to claim 1, wherein the second imaging includes:

selecting a single movement pattern from among a plurality of preset movement patterns;

selecting a single object from among at least some of the plurality of objects in a predetermined order, and setting the single selected object as a subject object captured by the virtual camera; and causing the virtual camera to perform imaging of the subject object while moving the virtual camera based on a position of the subject object and the single selected movement pattern.

12. The non-transitory computer-readable medium according to claim 1, wherein the predetermined condition for setting the display mode to the normal mode includes a case where the player object is passively moved during the scenery mode.

13. The non-transitory computer-readable medium according to claim 1, wherein the predetermined condition for setting the display mode to the normal mode includes a case where the status of the player object is a predetermined status during the scenery mode.

14. The non-transitory computer-readable medium according to claim 1, wherein, in the second imaging, a plurality of points of gaze is determined based on positions of the plurality of objects disposed in the game space, and the plurality of imaging positions is determined based on each of the plurality of points of gaze.

15. The non-transitory computer-readable medium according to claim 1, wherein, in the scenery mode, the game program causes the computer to repeatedly perform a process, the process including:

selecting a single imaging position from among the plurality of imaging positions; and causing the virtual camera to capture an image at the single imaging position for a predetermined time period, and the process, in the selecting, selects a new imaging position after the predetermined time period elapses.

16. The non-transitory computer-readable medium according to claim 1, wherein the second imaging includes:

setting the player object as a subject object captured by the virtual camera, and determining the plurality of imaging positions based on a position of the subject object; and determining directions of the virtual camera at the plurality of imaging positions based on the position of the subject object, and the predetermined condition for setting the display mode to the scenery mode includes a state in which the user, that controls the player object, does not perform an operation for a predetermined period of time.

17. The non-transitory computer-readable medium according to claim 16, wherein various states of the game space and the subject object are displayed in the game images captured at the plurality of imaging positions.

18. A non-transitory computer-readable medium including a game program for causing a server apparatus to control progress of a game, the server apparatus being connected to a game user terminal via a communication network, the game user terminal executing the game by imaging, with a virtual camera, a three-dimensional game space in which a plurality of objects including a player object controlled by a user are disposed, and displaying the game space on a display as a game image, the game program causing the server apparatus to execute:

setting a status of the player object to a seat-leaving status in which the user does not play a game based on a presence or an absence of an operation by the user;

setting a display mode of a game image displayed on the display out of at least a normal mode and a scenery mode according to a predetermined condition, the predetermined condition for setting the display mode to the scenery mode including a case where the status of the player object is the seat-leaving status;

causing the virtual camera which is disposed based on a position of the player object, to perform first imaging in a case where the display mode is the normal mode, and causing the virtual camera to perform second imaging at a plurality of imaging positions in the game space in a case where the display mode is the scenery mode; and displaying a game image captured by the virtual camera on the display in the case where the display mode is the normal mode, and displaying game images captured at the plurality of imaging positions in a predetermined display embodiment in the case where the display mode is the scenery mode, wherein the game images captured at the plurality of imaging positions are displayed on the display in a predetermined order as the predetermined display embodiment, and a first game image captured at a certain imaging position is displayed on the display for a predetermined time period, and then a second game image captured at a next imaging position is displayed according to the predetermined order on the display.

19. A game system including a server apparatus connected to a game user terminal via a communication network, the game user terminal executing a game by imaging, with a virtual camera, a three-dimensional game space in which a plurality of objects including a player object controlled by a user are disposed, and displaying the game space on a display as a game image, the system comprising:

at least one processor; and at least one memory including at least one set of instructions that, when executed by the at least one processor, causes the at least one processor to perform operations including:

setting a status of the player object to a seat-leaving status in which the user does not play a game based on a presence or an absence of an operation by the user;

setting a display mode of a game image displayed on the display out of at least a normal mode and a scenery mode according to a predetermined condition, the predetermined condition for setting the display mode to the scenery mode including a case where the status of the player object is the seat-leaving status;

causing the virtual camera which is disposed based on a position of the player object, to perform first imaging in a case where the display mode is the normal mode, and causing the virtual camera to perform second imaging at a plurality of imaging positions in the game space in a case where the display mode is the scenery mode; and displaying a game image captured by the virtual camera on the display in the case where the display mode is the normal mode, and displaying game images captured at the plurality of imaging positions in a predetermined display embodiment in the case where the display mode is the scenery mode, wherein the game images captured at the plurality of imaging positions are displayed on the display in a predetermined order as the predetermined display embodiment, and a first game image captured at a certain imaging position is displayed on the display for a predetermined time period, and then a second game image captured at a next imaging position is displayed according to the predetermined order on the display.

* * * * *